US010958333B2

(12) United States Patent
Hwang et al.

(10) Patent No.: US 10,958,333 B2
(45) Date of Patent: *Mar. 23, 2021

(54) APPARATUS AND METHOD FOR PERFORMING RELAY COMMUNICATION IN WIRELESS COMMUNICATION SYSTEM

(71) Applicant: Samsung Electronics Co., Ltd., Suwon-si (KR)

(72) Inventors: June Hwang, Incheon (KR); Sang-Wook Kwon, Suwon-si (KR); Young-Joong Mok, Suwon-si (KR); Hyun-Jeong Kang, Seoul (KR); Kyung-Kyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,762

(22) Filed: Jul. 1, 2019

(65) Prior Publication Data

US 2019/0326979 A1 Oct. 24, 2019

Related U.S. Application Data

(63) Continuation of application No. 15/617,587, filed on Jun. 8, 2017, now Pat. No. 10,341,009.

(30) Foreign Application Priority Data

Jun. 8, 2016 (KR) .................... 10-2016-0071293

(51) Int. Cl.
*H04W 4/00* (2018.01)
*H04B 7/155* (2006.01)
(Continued)

(52) U.S. Cl.
CPC ........ *H04B 7/15592* (2013.01); *H04B 7/155* (2013.01); *H04B 17/309* (2015.01);
(Continued)

(58) Field of Classification Search
CPC .. H04B 7/155; H04B 7/15592; H04B 17/309; H04B 17/327; H04L 12/863;
(Continued)

(56) References Cited

U.S. PATENT DOCUMENTS 6,678,252 B1   1/2004 Cansever
8,811,306 B2   8/2014 Callard et al.
(Continued)

FOREIGN PATENT DOCUMENTS

KR   10-2012-0074255 A   7/2012

OTHER PUBLICATIONS

Ericsson, Measurements, Signaling, and Selection Rules for Relay Discovery, R1-151767, 3GPP TSG RAN WG1 Meeting #80bis, 7 pages, Apr. 2015.*

(Continued)

*Primary Examiner* — Frank Duong
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). A method and apparatus for performing a relay communication are provided. A remote user equipment (UE) according to the present disclosure is configured to acquire a first parameter related to relay load from each of a plurality of relay candidate UEs, to select a relay UE which will perform a relay communication with the remote UE from among the plurality of relay candidate UEs based on the first parameter acquired from each of the plurality of relay candidate UEs, (Continued)

and to perform the relay communication with the selected relay UE. The first parameter is generated based on cellular communication load between a base station (BS) connected to a corresponding relay candidate UE and the corresponding relay candidate UE.

20 Claims, 22 Drawing Sheets

(51) Int. Cl.
    *H04W 40/12*     (2009.01)
    *H04W 40/22*     (2009.01)
    *H04W 40/24*     (2009.01)
    *H04W 28/02*     (2009.01)
    *H04W 76/34*     (2018.01)
    *H04B 17/309*     (2015.01)
    *H04L 12/863*     (2013.01)
    *H04W 72/12*     (2009.01)
    *H04W 84/04*     (2009.01)
    *H04W 88/04*     (2009.01)

(52) U.S. Cl.
    CPC ......... *H04L 47/54* (2013.01); *H04W 28/0278* (2013.01); *H04W 40/12* (2013.01); *H04W 40/22* (2013.01); *H04W 40/244* (2013.01); *H04W 76/34* (2018.02); *H04W 72/1215* (2013.01); *H04W 84/042* (2013.01); *H04W 88/04* (2013.01)

(58) Field of Classification Search
    CPC .. H04L 47/54; H04W 28/02; H04W 28/0278; H04W 36/08; H04W 40/12; H04W 40/22; H04W 40/244; H04W 52/383; H04W 52/46; H04W 72/12; H04W 72/1215; H04W 76/06; H04W 76/064; H04W 76/34; H04W 84/04; H04W 84/042; H04W 88/04
    See application file for complete search history.

(56) References Cited

U.S. PATENT DOCUMENTS

| | | | |
|---|---|---|---|
| 10,177,834 B2 * | 1/2019 | Basu Mallick | H04W 88/04 |
| 10,178,584 B2 * | 1/2019 | Lee | H04W 36/0011 |
| 10,212,651 B2 * | 2/2019 | Gulati | H04W 48/17 |
| 2006/0285505 A1 | 12/2006 | Cho et al. | |
| 2012/0040607 A1 | 2/2012 | Yang et al. | |
| 2012/0149296 A1 | 6/2012 | Sawai | |
| 2012/0182930 A1 | 7/2012 | Sawai | |
| 2013/0235791 A1 * | 9/2013 | Abraham | H04B 7/15 370/315 |
| 2013/0322388 A1 | 12/2013 | Ahn et al. | |
| 2014/0016574 A1 * | 1/2014 | Seo | H04L 5/0051 370/329 |
| 2014/0329535 A1 | 11/2014 | Sadiq et al. | |
| 2016/0037568 A1 * | 2/2016 | Hakola | H04W 72/085 370/329 |
| 2016/0135203 A1 | 5/2016 | Kim et al. | |
| 2017/0086114 A1 | 3/2017 | Jung et al. | |
| 2017/0353819 A1 * | 12/2017 | Yin | H04L 47/30 |

OTHER PUBLICATIONS

Fujitsu, Considerations on relay selection and reselection, 3GPP TSG-RAN WG2 Meeting#90, 6 pages, May 2015.

* cited by examiner

| | | eNB load | D2D load | U1~U5 load (UL/DL) | U6 load (UL/DL) |
|---|---|---|---|---|---|
| SCENARIO | 1 | Low | Low | 4kbps voice (4k/4k) | 128 kbps video (128k/22k) |
| | 2 | Low | High | 4kbps voice (4k/4k) | 128 kbps video (128k/22k) |
| | 3 | High | Low | 4kbps voice (4k/4k) | 128 kbps video (128k/22k) |
| | 4 | High | High | 4kbps voice (4k/4k) | 128 kbps video (128k/22k) |
| | 5 | Low | Low | 4kbps voice (4k/4k) | 4 kbps voice (4k/4k) |
| | 6 | Low | High | 4kbps voice (4k/4k) | 4 kbps voice (4k/4k) |
| | 7 | High | Low | 4kbps voice (4k/4k) | 4 kbps voice (4k/4k) |
| | 8 | High | High | 4kbps voice (4k/4k) | 4 kbps voice (4k/4k) |

APPARATUS AND METHOD FOR PERFORMING RELAY COMMUNICATION IN WIRELESS COMMUNICATION SYSTEM

CROSS-REFERENCE TO RELATED APPLICATION(S)

This application is a continuation application of prior application Ser. No. 15/617,587, filed on Jun. 8, 2017, which was based on and claimed priority under 35 U.S.C. § 119(a) of a Korean patent application number 10-2016-0071293, filed on Jun. 8, 2016, in the Korean Intellectual Property Office, the disclosure of which is incorporated by reference herein in its entirety.

TECHNICAL FIELD

The present disclosure relates to an apparatus and method for performing a relay communication in a wireless communication system. More particularly, the present disclosure relates to an apparatus and method for performing a relay communication based on relay load in a wireless communication system.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

Meanwhile, in a public safety (PS) environment where a disaster such as an earthquake, a fire, and/or the like occurs, a specific base station (BS) may not normally operate, so a communication for a specific user equipment (UE) which exists within a communication coverage of the BS may be impossible. So, a relay scheme may be used, and the relay scheme uses a UE which exists within a communication coverage of another BS which normally operates, not the BS which may not normally operate.

The relay scheme is based on a D2D communication scheme. The specific UE for which the communication is impossible may transmit data to a relay UE providing a relay service according to a D2D communication scheme. After receiving the data transmitted by the specific UE, the relay UE may transmit the received data to a BS according to a cellular communication scheme.

If the number of remote UEs transmitting data using a relay UE increases, connections may converge on a specific relay UE. In this case, the relay UE on which the connections converge may not provide a normal service due to relay overload, so service delay may occur due to the relay overload.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for performing a relay communication in a wireless communication system.

Another aspect of the present disclosure is to provide a method and apparatus for performing a relay communication based on relay load in a wireless communication system.

Still another aspect of the present disclosure is to provide a method and apparatus for performing a relay communication based on at least one of relay load, cellular communication load, and device to device (D2D) communication load in a wireless communication system.

Still another aspect of the present disclosure is to provide a method and apparatus for increasing reliability of a communication system such that degradation of communication quality due to load unbalance which may occur when a remote UE and a relay UE perform a wireless communication using a relay scheme may be solved.

In accordance with an aspect of the present disclosure, a method for performing a relay communication in a remote user equipment (UE) is provided. The method includes acquiring a first parameter related to relay load from each of a plurality of relay candidate UEs, selecting a relay UE which will perform a relay communication with the remote UE from among the plurality of relay candidate UEs based on the first parameter acquired from each of the plurality of relay candidate UEs, and performing the relay communication with the selected relay UE, wherein the first parameter is generated based on cellular communication load between a base station (BS) connected to a corresponding relay candidate UE and the corresponding relay candidate UE.

In accordance with another aspect of the present disclosure, a method for providing relay load information in a relay UE is provided. The method includes measuring cellular communication load between the relay UE and a BS connected to the relay UE, generating relay load information based on the measured cellular communication load, and broadcasting the generated relay load information.

In accordance with another aspect of the present disclosure, a remote UE is provided. The remote UE includes a transceiver configured to acquire a first parameter related to relay load from each of a plurality of relay candidate UEs, and a processor configured to select a relay UE which will perform a relay communication with the remote UE from among the plurality of relay candidate UEs based on the first parameter acquired from each of the plurality of relay candidate UEs, and to control the transceiver to perform the relay communication with the selected relay UE, wherein the first parameter is generated based on cellular communication load between a BS connected to a corresponding relay candidate UE and the corresponding relay candidate UE.

In accordance with another aspect of the present disclosure, a relay UE is provided. The relay UE includes a processor configured to measure cellular communication load between the relay UE and a BS connected to the relay UE, and to generate relay load information based on the measured cellular communication load, and a transceiver configured to broadcast the generated relay load information.

In accordance with another aspect of the present disclosure, a non-transitory computer readable medium is provided. The non-transitory computer readable non-volatile recording medium includes instructions for executing a process of acquiring a first parameter related to relay load from each of a plurality of relay candidate UEs, a process of selecting a relay UE which will perform a relay communication with the remote UE from among the plurality of relay candidate UEs based on the first parameter acquired from each of the plurality of relay candidate UEs, and process of performing the relay communication with the selected relay UE, wherein the first parameter is generated based on cellular communication load between a BS connected to a corresponding relay candidate UE and the corresponding relay candidate UE.

In accordance with another aspect of the present disclosure, a non-transitory computer readable medium is provided. The computer readable non-volatile recording medium includes instructions for executing a process of measuring cellular communication load between the relay UE and a BS connected to the relay UE, generating relay load information based on the measured cellular communication load, and broadcasting the generated relay load information.

The technical problem to be solved in the present disclosure is not limited to the technical problems as described above, and technical problems not described above will become apparent to those skilled in the art from the following detailed description.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation, the term "or," is inclusive, meaning and/or, the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like, and the term "processor" means any device, system or part thereof that controls at least one operation, such a device may be implemented in hardware, firmware or software, or some combination of at least two of the same. It should be noted that the functionality associated with any particular processor may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
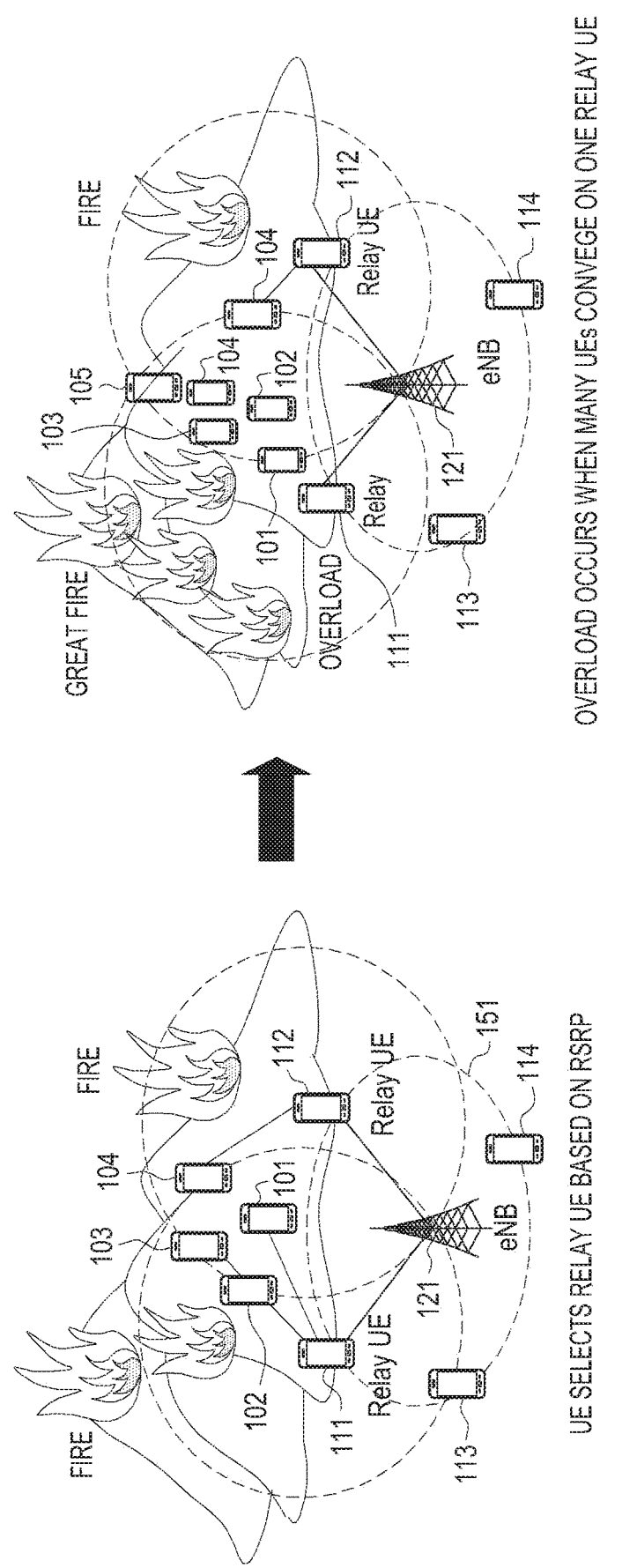
FIGS. 1A and 1B schematically illustrate an environment of a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, operation, component, element, or combination thereof, but do not preclude the presence or addition of one or more other features, numbers, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an Moving Picture Experts Group phase 1 or phase 2 (MPEG-1 or MPEG-2) audio layer 3 (MP3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a transmitting apparatus or a receiving apparatus may be, for example, a base station (BS). The BS is a device which communicates with a UE, and the term BS may be interchangeable with the term node B (NB), evolved node B (eNB), access point, and/or the like.

According to various embodiments of the present disclosure, a transmitting apparatus or a receiving apparatus may be, for example, a UE. The UE is a device which communicates with a BS or another UE, and the term UE may be interchangeable with the term node, mobile station (MS), mobile equipment (ME), device, terminal, and/or the like.

According to various embodiments of the present disclosure, a transmitting apparatus or a receiving apparatus may be, for example, a relay UE. The relay UE may be, for example, a UE which provides a relay service to a UE which is located out of a coverage of a BS. The relay UE may be, for example, a UE which provides a relay service to a UE which may not perform a cellular communication with the BS even though the UE is located within a coverage of a BS or a UE to which cellular communication control by the BS is not provided even though the UE is located within the coverage of the BS.

According to various embodiments of the present disclosure, a transmitting apparatus or a receiving apparatus may be, for example, a remote UE. The remote UE may be, for example, a UE which communicates with a BS using a relay service provided by a relay UE. The remote UE which uses the relay service may perform a device to device (D2D) communication with the relay UE, and the relay UE may perform a cellular communication with the BS.

According to various embodiments of the present disclosure, the terms remote UE and relay UE may be interchangeable with the terms first UE and second UE, and/or the like, respectively.

According to various embodiments of the present disclosure, a relay candidate UE may be a UE which may provide a relay service. If a UE selects a relay candidate UE which will provide a relay service to the UE among relay candidate UEs, the selected relay candidate UE may operate as a relay UE, and the UE may operate as a remote UE.

In various embodiments of the present disclosure, a UE which needs to use a relay service or performs a pre-procedure for using the relay service even before the UE uses the relay service may be referred to as remote UE.

Various embodiments of the present disclosure provide a method and apparatus for performing a relay communication in a wireless communication system.

Various embodiments of the present disclosure provide a method and apparatus for performing a relay communication based on relay load in a wireless communication system.

Various embodiments of the present disclosure provide a method and apparatus for performing a relay communication based on at least one of relay load, cellular communication load, and D2D communication load in a wireless communication system.

Various embodiments of the present disclosure provide a method and apparatus for increasing communication reliability such that degradation of communication quality due to load unbalance which may occur when a remote UE and a relay UE perform a wireless communication using a relay scheme may be solved in a wireless communication system.

An apparatus and method proposed in various embodiments of the present disclosure may be applied to various communication systems such as an institute of electrical and electronics engineers (IEEE) 802.11ac communication system, an IEEE 802.16 communication system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system, an evolved packet system (EPS), an LTE mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, and a mobile internet protocol (Mobile IP) system, and/or the like.

An environment of a wireless communication system according to an embodiment of the present disclosure will be described with reference to FIGS. 1A and 1B.

FIGS. 1A and 1B schematically illustrate an environment of a wireless communication system according to an embodiment of the present disclosure.

Referring to FIGS. 1A and 1B, the wireless communication system includes an eNB 121, remote UEs located out of a communication coverage 151 of the eNB 121, e.g., a remote UE 1 101 to a remote UE 4 104, and relay candidate UEs located within the communication coverage 151 of the eNB 121, e.g., a relay candidate UE 1 111 to a relay candidate UE 4 114.

In a public safety (PS) environment where a disaster such as fire, and/or the like occurs as shown in FIG. 1A, the relay candidate UE 1 111 to the relay candidate UE 4 114 which exist within the communication coverage 151 of the eNB 121 located out of a disaster range may perform a cellular communication with the eNB 121, however, the remote UE 1 101 to the remote UE 4 104 which exist out of communication coverage 151 of the eNB 121 may not normally perform a cellular communication with the eNB 121.

In this case, some relay candidate UEs, e.g., the relay candidate UE 1 111 and the relay candidate UE 2 112 of the relay candidate UE 1 111 to the relay candidate UE 4 114 which exist within the communication coverage 151 of the eNB 121 may operate as a relay UE. So, the remote UE 1 101 to the remote UE 3 103 may communicate with the eNB 121 using a relay UE 1 111, and the remote UE 104 may communicate with the eNB 121 using a relay UE 2 112.

The relay candidate UE 1 111 to the relay candidate UE 4 114 may broadcast a discovery message for discovering a UE which needs a relay service, or a relay discovery message. For example, the relay candidate UE 1 111 to the relay candidate UE 4 114 may broadcast a discovery at a set period, e.g., every about 10 ms, through a physical downlink shared channel (PDSCH).

The remote UE 1 101 to the remote UE 4 104 which are located out of the communication coverage 151 of the eNB 121 may receive a discovery message from the relay candidate UE 1 111 to the relay candidate UE 4 114.

After receiving the discovery message, each of the remote UE 1 101 to the remote UE 4 104 may select a relay UE suitable for receiving a relay service from among the relay candidate UE 1 111 to the relay candidate UE 4 114. For example, each the remote UE 1 101 to the remote UE 4 104 may select a relay UE which provides a signal of which a reference signal received power (RSRP) value is greater than or equal to a set threshold value, and corresponds to a relay service code or accords with the relay service code from among the relay candidate UE 1 111 to the relay candidate UE 4 114. The relay service code may include an identification parameter used for a connection between devices in a proximity-based service (ProSe) in which a discovery and a connection between physically proximate devices are possible.

In FIGS. 1A and 1B, RSRP has been used as an example of a metric indicating link quality, however, one of various metrics such as received signal code power (RSCP), a reference signal strength indicator (RSSI), a reference signal received quality (RSRQ), a carrier-to-interference noise ratio (CINR), a signal-to-noise ratio (SNR), a block error rate (BLER), and/or the like may be used as a metric indicating link quality.

The remote UE 1 101 to the remote UE 4 104 may communicate with the eNB 121 using a selected relay UE. For example, the remote UE 1 101 to the remote UE 3 103 may communicate with the eNB 121 using the relay UE 1 111, and the remote UE 4 104 may communicate with the eNB 121 using the relay UE 2 112.

In this situation, as shown in FIG. 1B, a disaster situation becomes worse, so the number of UEs, e.g., remote UEs, which are located out of the communication coverage 151 of the eNB 121 may increase. For example, in FIG. 1B, the number of the remote UEs, e.g., remote UEs 101 to 105, may increase compared to FIG. 1A. In this case, for example, connections of UEs 101 to 103, and 105 which are located out of the communication coverage 151 converge on one of the relay UE 1 111 and a relay UE 112 which provide a relay service. For example, the one of the relay UE 1 111 and the relay UE 112 is the relay UE 1 111. So, relay overload may occur on the relay UE 1 111 and communication delay due to this relay overload may occur.

According to an embodiment of the present disclosure, the remote UE 1 101 to the remote UE 5 105 to be connected to the relay UE 1 111 and the relay UE 2 112 may be determined based on communication load between the relay UE 1 111 and the eNB 121 as well as received signal strength, e.g., an RSRP value.

An environment of a wireless communication system according to an embodiment of the present disclosure has been described with reference to FIGS. 1A and 1B, and an environment in which a relay UE is selected in a wireless communication system according to an embodiment of the present disclosure will be described with reference to FIG. 2.

Figure 2:
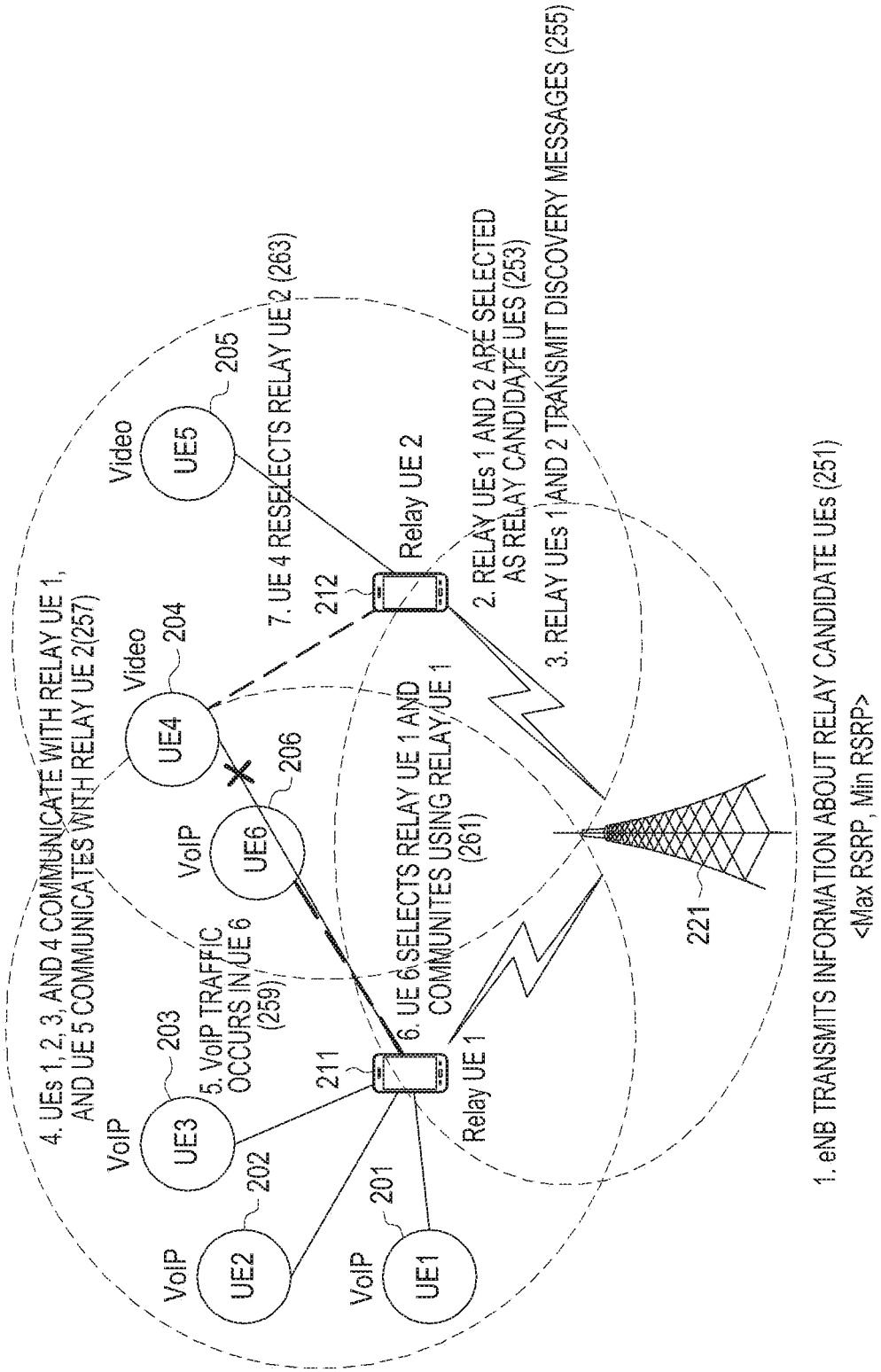
FIG. 2 schematically illustrates an environment in which a relay user equipment (UE) is selected in a wireless communication system according to an embodiment of the present disclosure.

FIG. 2 schematically illustrates an environment in which a relay UE is selected in a wireless communication system according to an embodiment of the present disclosure.

Referring to FIG. 2, an eNB 221 may transmit information required for determining a relay candidate UE to a relay UE 1 211 and a relay UE 2 212 at operation 251. The eNB 221 may transmit information, e.g., a maximum RSRP value and a minimum RSRP value, required for determining the relay candidate UE. Here, each of the maximum RSRP value and the minimum RSRP value may be determined as a value within a range suitable for a relay communication, e.g., a range where a distortion of a signal does not occur. A scheme of determining the maximum RSRP value and the minimum RSRP value may be implemented with various forms, and a detailed description thereof will be omitted herein. Each of the maximum RSRP value and the minimum RSRP value may be determined by the eNB 221 or may be a set value. If the relay UE 1 211 and the relay UE 2 212 are selected as a relay candidate UE based on the maximum RSRP value and the minimum RSRP value at operation 253, the relay UE 1 211 and the relay UE 2 212 may broadcast a discovery message as a message informing that a relay communication may be provided at operation 255. The discovery message may include a parameter, e.g., relay load information, including a load metric value measured in a corresponding relay UE. The discovery message may include an identifier (ID) of the corresponding relay UE and a relay service code.

The load metric value may be included in, for example, an 11 byte-spare region included in a relay discovery announcement message as a discovery message using a PC5 interface defined in Release-13 of 3GPP. So, the load metric value may be broadcasted through the relay discovery announcement message.

Based on the discovery message, a remote UE 1 201 to a remote UE 4 204 may communicate with an eNB 221 using the relay UE 1 211, and a remote UE 5 205 may communicate with the eNB 221 using the relay UE 2 212 at operation 257.

In this situation, for example, voice over internet protocol (VoIP) traffic may increase or occur in a UE 6 206 at operation 259. In FIG. 2, an embodiment of the present disclosure will be described assuming that the VoIP traffic occurs in the UE 6 206, however, an embodiment of the present disclosure may be equally applied to a case that the VoIP traffic increases in the UE 6 206 as well as a case that the VoIP traffic occurs in the UE 6 206.

The UE 6 206 where the VoIP traffic occurs may determine a relay UE which will communicate with the UE 6 206. For this, the UE 6 206 may check a discovery message including relay load information transmitted by each of the relay UE 1 211 and the relay UE 2 212. The UE 6 206 may select the relay UE 1 211 as a relay UE for a relay service based on the relay load information included in each discovery message at operation 261.

The UE 6 206 selecting the relay UE 1 211 as the relay UE may perform a VoIP communication with the eNB 221 using the relay UE 1 211.

Since the UE 6 206 communicates with the relay UE 1 211, relay overload may occur in the relay UE 1 211, so a communication between the relay UE 1 211 and the remote UE 4 204 may be delayed.

So, the remote UE 4 204 may receive a discovery message including updated relay load information from each of the relay UE 1 211 and the relay UE 2 212.

The remote UE 4 204 may reselect the relay UE 2 212, not the relay UE 1 211, as the relay UE for the relay service based on the updated relay load information included in each discovery message at operation 263.

An environment in which a relay UE is selected in a wireless communication system according to an embodiment of the present disclosure has been described with reference to FIG. 2, and an example of a process of selecting a relay UE in a wireless communication system according to an embodiment of the present disclosure will be described with reference to FIG. 3.

Figure 3:
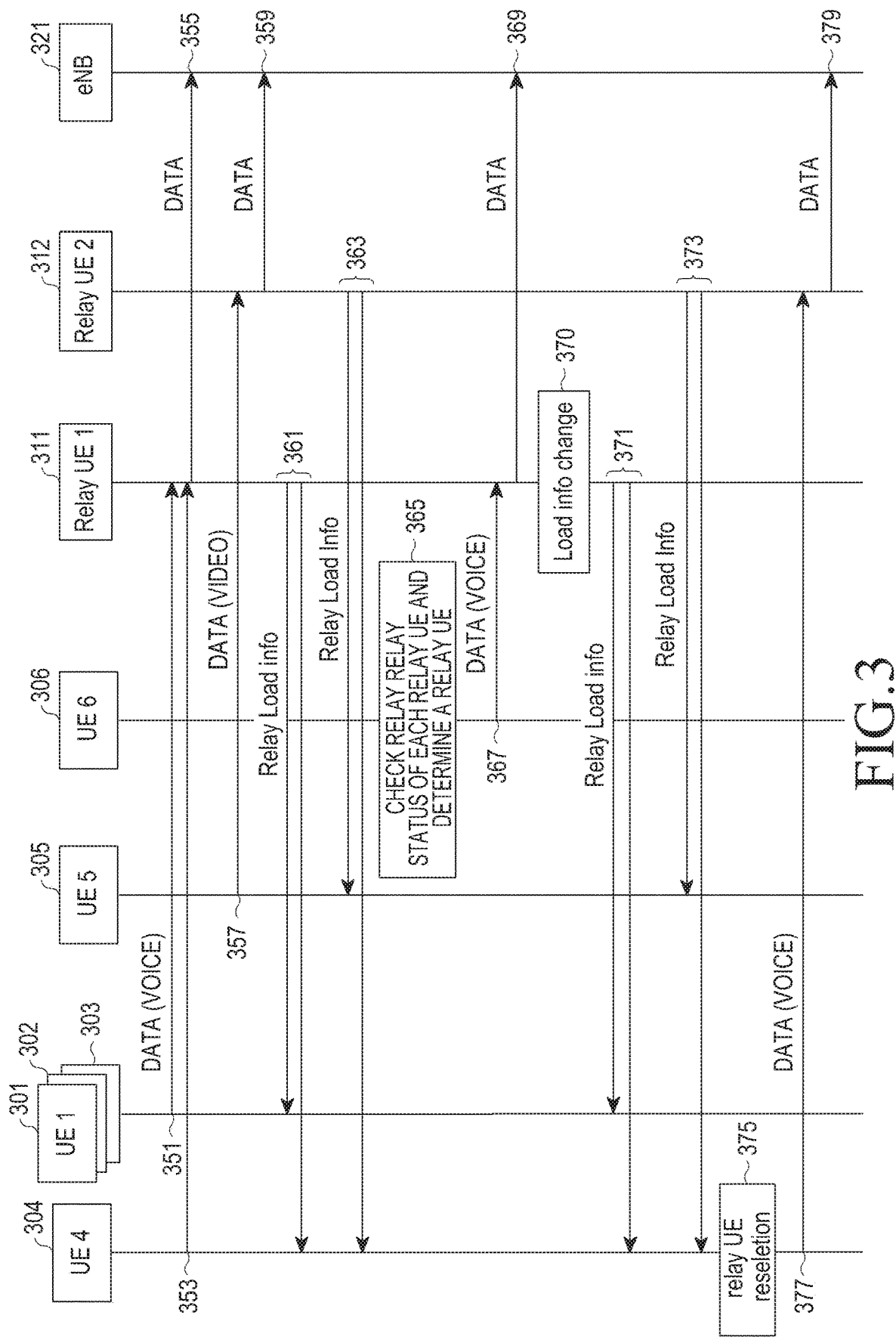
FIG. 3 schematically illustrates an example of a process of selecting a relay UE in a wireless communication system according to an embodiment of the present disclosure.

FIG. 3 schematically illustrates an example of a process of selecting a relay UE in a wireless communication system according to an embodiment of the present disclosure.

Referring to FIG. 3, it will be noted that a process of selecting a relay UE in FIG. 3 is a process of selecting a relay UE which corresponds to an environment where a UE selects a relay UE as described in FIG. 2.

Firstly, a remote UE 1 301 to a remote UE 4 304 may transmit data to a relay UE 1 311 at operations 351 and 353. Here, data may be, for example, voice data provided in a VoIP service. The relay UE 1 311 may transmit received data to an eNB 321 at operation 355. So, the remote UE 1 301 to the remote UE 4 304 may communicate with the eNB 321.

A remote UE 5 305 may transmit data to a relay UE 2 312 at operation 357, and the relay UE 2 312 may transmit data received from the remote UE 5 305 to the eNB 321 at operation 359. Here, the data may be, for example, video data.

Meanwhile, each of the relay UE 1 311 and the relay UE 2 312 may broadcast a discovery message including relay load information. For example, the relay UE 1 311 may broadcast a discovery message including relay load information such that the remote UE 1 301 to the remote UE 4 304 may receive the discovery message at operation 361, and the relay UE 2 312 may broadcast a discovery message including relay load information such that the remote UE 4 304 and the remote UE 5 305 may receive the discovery message at operation 363.

In this situation, data traffic may occur in a UE 6 306. In this case, the UE 6 306 may check a relay status of each of the relay UE 1 311 and the relay UE 2 312 based on relay load information included in a discovery message broadcasted in each of the relay UE 1 311 and the relay UE 2 312 to select a relay UE to which the UE 6 306 will transmit data at operation 365.

If the relay UE 1 311 is selected as the relay UE, the UE 6 306 may transmit data to the relay UE 1 311 at operation 367. The data may be, for example, voice data. After receiving the data from the UE 6 306, the relay UE 1 311 may transmit the received data to the eNB 321 at operation 369.

Since the UE 6 306 communicates with the relay UE 1 311, relay load information generated in the relay UE 1 311 may be updated at operation 370.

So, the relay UE 1 311 may broadcast a discovery message including updated relay load information such that the remote UE 1 301 to the remote UE 4 304 may receive the discovery message at operation 371, and the relay UE 2 312 may broadcast a discovery message including updated relay load information such that the remote UE 4 304 and the remote UE 5 305 may receive the discovery message at operation 373.

The remote UE 4 304 may change a relay UE from the relay UE 1 311 to the relay UE 2 312 based on the update relay load information included in the discovery message broadcasted by each of the relay UE 1 311 and the relay UE 2 312 at operation 375. That is, the remote UE 4 304 may reselect the relay UE 2 312 as the relay UE.

The remote UE 4 304 may transmit data to the reselected relay UE 2 312 at operation 377. Here, the data may be, for example, voice data. The relay UE 2 312 may transmit the data received from the remote UE 4 304 to the eNB 321 at operation 379.

Meanwhile, in an embodiment of the present disclosure, a relay candidate UE may estimate cellular communication load, e.g., LTE communication load, as load between an eNB and a relay UE and D2D communication load as load between the relay UE and a remote UE in order to determine a load metric value included in relay load information. Here, a load metric may be a function which inputs a plurality of parameters for indicating cellular communication load of a UE.

Equations (1), (3), and (5) are examples of load metric equations which consider cellular communication load and D2D communication load together, and Equations (2), (4), and (6) are examples of load metric equations which consider the cellular communication load and the D2D communication load separately.

A relay candidate UE may determine a load metric value by using the load metric equations or combining at least two of the load metric equations.

$$S = \frac{1}{\{\alpha \cdot A_{\{LTE,T\}} + (1-\alpha) \cdot A_{\{D2D,T\}}\}} \quad \text{Equation 1}$$

In Equation 1, S denotes an inverse value of weighted mean of $A_{\{LTE,T\}}$ as LTE uplink (UL) data amount granted during a time T and D2D data amount granted during the time T.

Here, α denotes a separation factor of a downlink (DL) and a UL. The separation factor may be a load ratio determined according to a characteristic of traffic. For example, if traffic is voice traffic, a data rate of a UL is 4 Kbps, and a data rate of a DL is 4 Kbps, the separation factor may be 1 (=4K/4K). If the traffic is video traffic, the data rate of the UL is 128 kbps, and the data rate of the DL is 1 kbps, the separation factor may be 128 (=128K/1K).

In Equation 1, T denotes a time window as a time during communication load is measured.

Further, data amount may be the number of physical resource blocks (PRBs) or may be estimated data amount in bytes.

$$S1 = \frac{1}{A_{\{LTE,T\}}}, S2 = \frac{1}{A_{\{D2D,T\}}} \quad \text{Equation 2}$$

In Equation 2, S1 denotes an inverse value of $A_{\{LTE,T\}}$ as LTE UL data amount granted during a time T, and S2 denotes an inverse value of $A_{\{D2D,T\}}$ as D2D data amount granted during the time T.

$$R = \frac{1}{\{\alpha \cdot R_{\{LTE,T\}} + (1-\alpha) \cdot R_{\{D2D,T\}}\}} \quad \text{Equation 3}$$

In Equation 3, $$R_{\{LTE,T\}} = \frac{A_{\{LTE,T\}}}{B_{\{LTE,T\}}}$$

denotes a ratio of $B_{\{LTE,T\}}$ as LTE UL data amount requested during a time T to $A_{\{LTE,T\}}$ as LTE UL data amount granted during the time T, and $$R_{\{D2D,T\}} = \frac{A_{\{D2D,T\}}}{B_{\{D2D,T\}}}$$

denotes a ratio of $B_{\{D2D,T\}}$ as D2D data amount requested during the time T to $A_{\{D2D,T\}}$ as D2D data amount granted during the time T.

So, in Equation 3, R denotes an inverse value of weighted mean of a ratio of LTE UL data amount requested during the time T and LTE UL data amount granted during the time T and a ratio of D2D data amount requested during the time T and D2D data amount granted during the time T.

$$R1 = \frac{1}{R_{\{LTE,T\}}}, R2 = \frac{1}{R_{\{D2D,T\}}} \quad \text{Equation 4}$$

In Equation (4), R1 denotes an inverse value of a ratio of $B_{\{LTE,T\}}$ as LTE UL data amount requested during a time T to $A_{\{LTE,T\}}$ as LTE UL data amount granted during the time T, and R2 denotes an inverse value of a ratio of $B_{\{D2D,T\}}$ as D2D data amount requested during the time T to $A_{\{D2D,T\}}$ as D2D data amount granted during the time T.

$$L = \alpha \cdot C_{\{LTE\}} \cdot R_{\{LTE,T\}} + (1-\alpha) \cdot C_{\{D2D\}} \cdot R_{\{D2D,T\}} \quad \text{Equation 5}$$

In Equation 5, $C_{\{LTE\}}$ denotes amount of data which is currently in an LTE UL buffer, i.e., data amount currently buffered in the LTE UL buffer, and $C_{\{D2D\}}$ denotes amount of data which is currently in a D2D transmission (TX) buffer. So, L denotes a weighted mean time waiting until data currently buffered in a buffer of a relay UE is transmitted.

$$L1 = C_{\{LTE\}} \cdot R_{\{LTE,T\}}, L2 = C_{\{D2D\}} \cdot R_{\{D2D,T\}} \quad \text{Equation 6}$$

In Equation 6, L1 denotes a time waiting until data currently buffered in an LTE UL buffer of a relay UE is transmitted, and L2 denotes a time waiting until data currently buffered in a D2D TX buffer of the relay UE is transmitted.

Meanwhile, as expressed in Equations 2, 4, and 6, if an LTE load metric value and a D2D load metric value are acquired separately, a remote UE may selectively apply a weight for load metrics based on a kind of traffic processed in the remote UE.

For example, if the traffic processed in the remote UE is voice traffic, the remote UE may predict load of a relay UE by applying a weight 0.5 to R1 and R2 determined based on Equation 4 in the relay UE and superposing the weight-applied R1 and R2.

If the traffic processed in the remote UE is video traffic, the remote UE may predict load of a relay UE by applying a weight 0.9 and a weight 0.1 to R1 and R2, respectively, and superposing the weight-applied R1 and R2. If a weight 0 is applied to R2, the remote UE may predict the load of the relay UE using only cellular communication load of the relay UE.

Here, a weight is stored at a remote UE, and the weight may be a value which is determined based on a traffic characteristic in a general application program which is well known to a person skilled in the art or a value which is determined by measuring a ratio of UL traffic to DL traffic in the remote UE during a set time.

Meanwhile, each Equation as described above may be used as a load metric. Further, based on a corresponding load metric, an indicator indicating whether a UE may additionally allocate a resource for a relay may be transmitted. The indicator may be implemented with, for example, one bit. For example, whether a UE may additionally allocate a resource for a relay may be determined based on a result of comparing a value of one of Equations 1 to 6 with a set threshold value. If the value of one of Equations 1 to 6 is greater than the set threshold value, the UE determines that the UE may additionally allocate the resource for the relay to set a value of the indicator to, for example, 1. If the value of one of Equations 1 to 6 is less than or equal to the set threshold value, the UE determines that the UE may not additionally allocate the resource for the relay to set the value of the indicator to, for example, zero (0).

Another example of a process of selecting a relay UE in a wireless communication system according to an embodiment of the present disclosure will be described with reference to FIG. 4.

Figure 4:
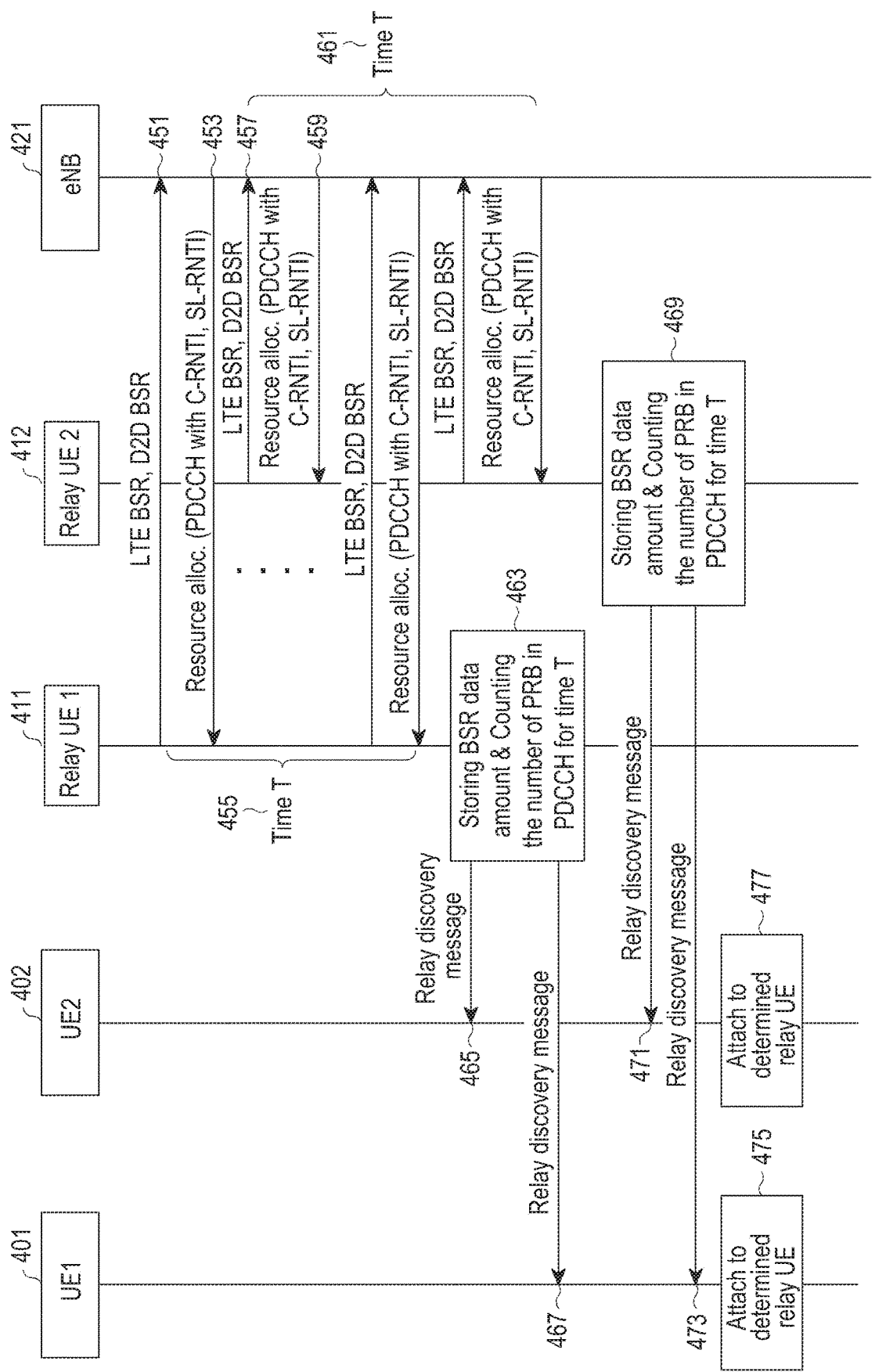
FIG. 4 schematically illustrates another example of a process of selecting a relay UE in a wireless communication system according to an embodiment of the present disclosure.

FIG. 4 schematically illustrates another example of a process of selecting a relay UE in a wireless communication system according to an embodiment of the present disclosure.

Referring to FIG. 4, it will be assumed that all of a relay UE 1 411 and a relay UE 2 412 are connected to the same eNB 421.

The relay UE 1 411 may transmit an LTE buffer status report (BSR) message and a D2D BSR message to the eNB 421 at operation 451. Here, a BSR message may be a medium access control (MAC) layer message including information about data amount to be transmitted in a buffer of a UE.

After receiving the LTE BSR message and the D2D BSR message from the relay UE 1 411, the eNB 421 may transmit, to the relay UE 411, a resource allocation message including a cell-radio network temporary identifier (C-RNTI) as a UE ID, a sidelink-radio network temporary identifier (SL-RNTI) as a D2D communication ID, and information about granted data amount through a physical downlink control channel (PDCCH) at operation 453. Exchange of these messages may be repeated during a time T 455.

The relay UE 2 412 may transmit an LTE BSR message and a D2D BSR message to the eNB 421 at operation 457, and the eNB 421 may transmit, to the relay UE 2 412, a resource allocation message including information about granted data amount through a PDCCH in response to each of the LTE BSR message and the D2D BSR message received from the relay UE 2 412 at operation 459. Exchange of the LTE BSR message, the D2D BSR message, and a response message for each of the LTE BSR message and the D2D BSR message may be repeated during a time T 461.

The relay UE 1 411 may store data amount requested through a BSR message during the time T 455 and measure granted data amount to update a load metric value at operation 463. The granted data amount may be determined based on the number of PRBs and a modulation and coding scheme (MCS) value included in a resource allocation message. The relay UE 1 411 may broadcast a discovery message including an updated load metric value such that a remote UE 1 401 and a remote UE 2 402 may receive the discovery message at operations 465 and 467.

The relay UE 2 412 may store data amount requested through a BSR message during the time T 461 and measure granted data amount to update a load metric value at operation 469. The relay UE 2 412 may broadcast a discovery message including an updated load metric value such that the remote UE 1 401 and the remote UE 2 402 may receive the discovery message at operations 471 and 473.

Each of the remote UE 1 401 and the remote UE 2 402 may select a relay UE which will provide a relay service based on a received load metric value. So, each of the remote UE 1 401 and the remote UE 2 402 may be connected to a selected relay UE to communicate with the eNB 421 at operations 475 and 477.

Meanwhile, in various embodiments of the present disclosure, a remote UE may select a relay UE which will provide a relay service using a metric value, e.g., an RSRP value, indicating link quality along with a received load metric value. For example, a remote UE may calculate load of a relay UE by multiplying an RSRP value with an inverse value of a load metric value. That is, the remote UE may preferentially select a UE of which an RSRP value is large and a load metric value is small from among relay candidate UEs as a relay UE.

Another example of a process of selecting a relay UE in a wireless communication system according to an embodiment of the present disclosure has been described with reference to FIG. 4, and examples of a process of providing relay load information in a wireless communication system according to an embodiment of the present disclosure will be described with reference to FIGS. 5A and 5B.

Firstly, an example of a process of providing relay load information based on D2D communication load in a wireless communication system according to an embodiment of the present disclosure will be described with reference to FIG. 5A.

Figure 5A:
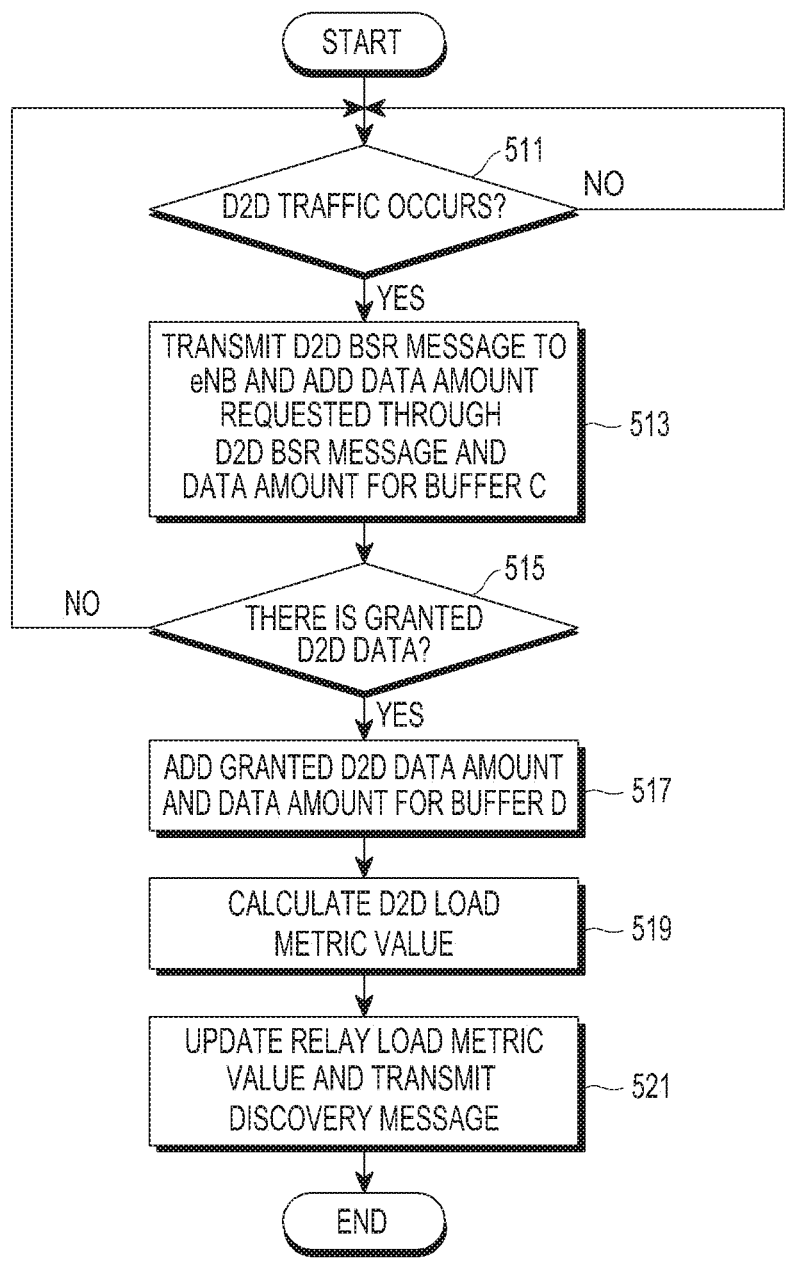
FIG. 5A schematically illustrates an example of a process of providing relay load information based on device to device (D2D) communication load in a wireless communication system according to an embodiment of the present disclosure.

FIG. 5A schematically illustrates an example of a process of providing relay load information based on D2D communication load in a wireless communication system according to an embodiment of the present disclosure.

Referring to FIG. 5A, a relay UE may determine whether D2D traffic occurs at operation 511.

If the D2D traffic occurs, the relay UE proceeds to operation 513. The relay UE transmits a D2D BSR message to an eNB and adds data amount requested through the D2D BSR message and data amount for a buffer C at operation 513, and proceeds to operation 515. For example, the data amount requested through the D2D BSR message may be continuously added to the data amount for the buffer C during a time T.

The relay UE determines whether there is D2D data granted from the eNB in response to the transmitted D2D BSR message at operation 515.

If there is the granted D2D data, the relay UE proceeds to operation 517. The relay UE adds the granted D2D data amount and data amount for a buffer D, and proceeds to operation 519. For example, the data amount granted from the eNB may be continuously added to the data amount for the buffer D during the time T.

The relay UE calculates a D2D load metric value based on values recorded at the buffer C and the buffer D during the time T, e.g., the data amount for the buffer C and the data amount for the buffer D at operation 519, and proceeds to operation 521.

The relay UE updates a final relay load metric value using the calculated D2D load metric value and LTE load metric value and includes an updated load metric value into a discovery message to broadcast the updated load metric value. Alternatively, the relay UE may broadcast a discovery message including a calculated D2D load metric value.

Although FIG. 5A illustrates an example of a process of providing relay load information based on D2D communication load in a wireless communication system according to an embodiment of the present disclosure, various changes could be made to FIG. 5A. For example, although shown as a series of operations, various operations in FIG. 5A could overlap, occur in parallel, occur in a different order, or occur multiple times.

An example of a process of providing relay load information based on D2D communication load in a wireless communication system according to an embodiment of the present disclosure has been described with reference to FIG. 5A, and an example of a process of providing relay load information based on LTE communication load in a wireless communication system according to an embodiment of the present disclosure will be described with reference to FIG. 5B.

Figure 5B:
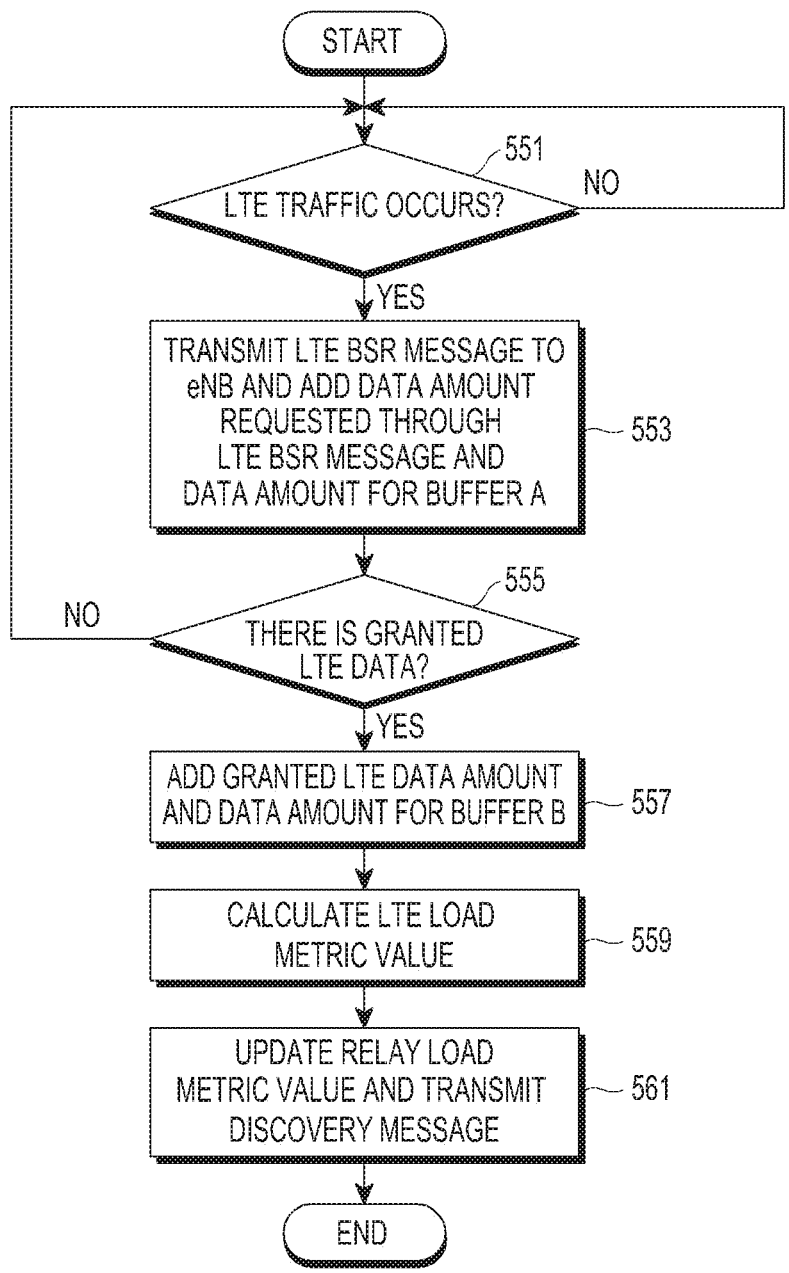
FIG. 5B schematically illustrates an example of a process of providing relay load information based on long term evolution (LTE) communication load in a wireless communication system according to an embodiment of the present disclosure.

FIG. 5B schematically illustrates an example of a process of providing relay load information based on LTE communication load in a wireless communication system according to an embodiment of the present disclosure.

Referring to FIG. 5B, a relay UE may determine whether LTE traffic occurs at operation 551.

If the LTE traffic occurs, the relay UE proceeds to operation 553. The relay UE transmits an LTE BSR message to an eNB and adds data amount requested through the LTE BSR message and data amount for a buffer A at operation 553, and proceeds to operation 555. For example, data amount requested through the LTE BSR message may be continuously added to the data amount for the buffer A during a time T.

The relay UE determines whether there is LTE data granted from the eNB in response to the transmitted LTE BSR message at operation 555.

If there is the granted LTE data, the relay UE proceeds to operation 557. The relay UE adds granted LTE data amount and data amount for a buffer B, and proceeds to operation 559.

The relay UE calculates an LTE load metric value based on values recorded at the buffer A and the buffer B during the time T, e.g., the data amount for the buffer A and the data amount for the buffer B at operation 559, and proceeds to operation 561.

The relay UE updates a relay load metric value using the calculated LTE load metric value and D2D load metric value and includes the updated relay load metric value into a discovery message to broadcast the updated relay load metric value. Alternatively, the relay UE may broadcast a discovery message including a calculated LTE load metric value.

Although FIG. 5B illustrates an example of a process of providing relay load information based on LTE communication load in a wireless communication system according to an embodiment of the present disclosure, various changes could be made to FIG. 5B. For example, although shown as a series of operations, various operations in FIG. 5B could overlap, occur in parallel, occur in a different order, or occur multiple times.

An example of a process of providing relay load information based on LTE communication load in a wireless communication system according to an embodiment of the present disclosure has been described with reference to FIG. 5B, and still another example of a process of selecting a relay UE in a wireless communication system according to an embodiment of the present disclosure will be described with reference to FIG. 6.

Figure 6:
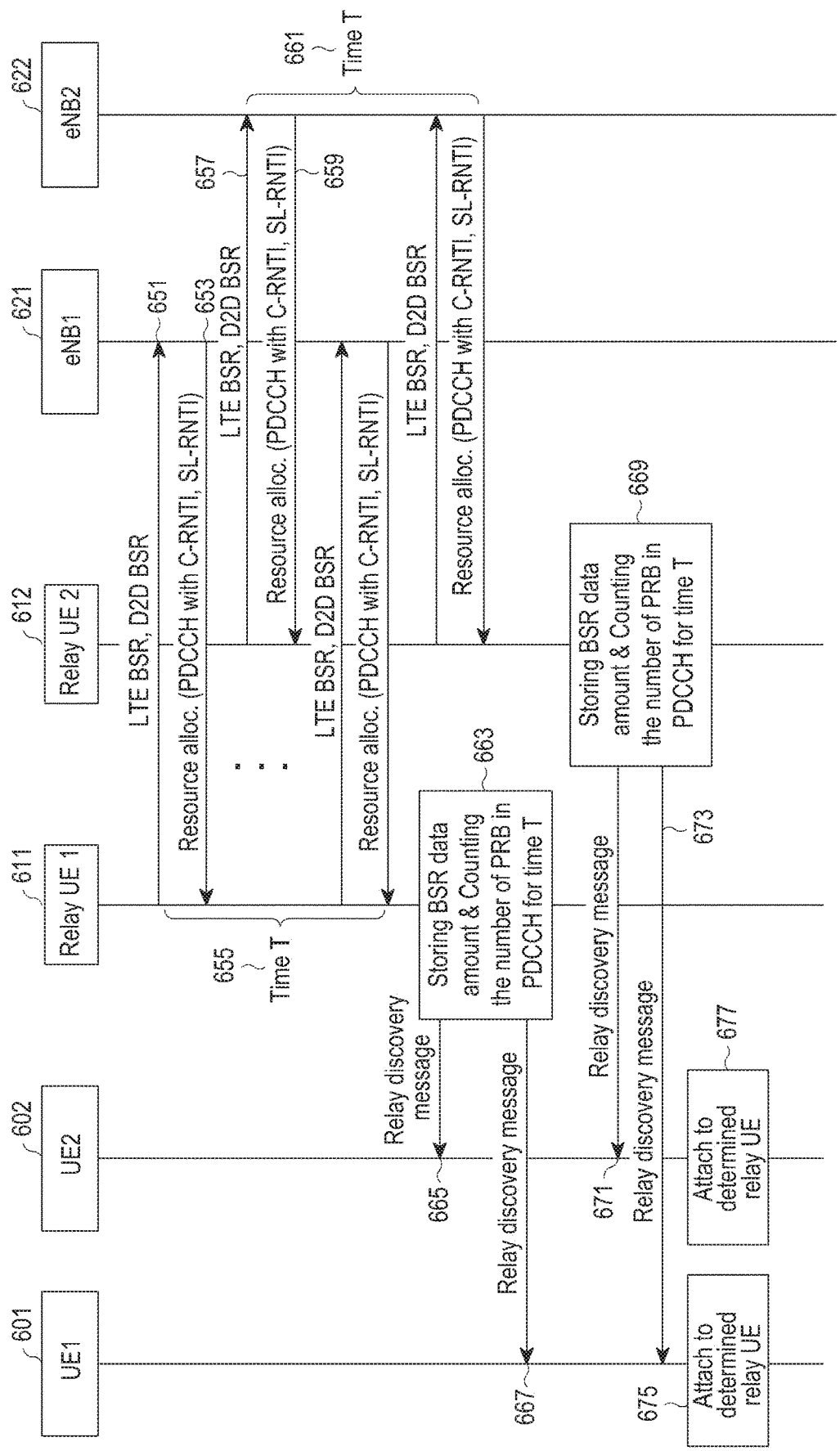
FIG. 6 schematically illustrates still another example of a process of selecting a relay UE in a wireless communication system according to an embodiment of the present disclosure.

FIG. 6 schematically illustrates still another example of a process of selecting a relay UE in a wireless communication system according to an embodiment of the present disclosure.

Referring to FIG. 6, it will be assumed that a relay UE 1 611 is connected to an eNB 1 621 and a relay UE 2 612 is connected to an eNB 2 622.

The relay UE 1 611 may transmit an LTE BSR message and a D2D BSR message to the eNB 1 621 at operation 651. After receiving the LTE BSR message and the D2D BSR message from the relay UE 1 611, the eNB 1 621 may transmit a resource allocation message including granted data amount, a C-RNTI, and an SL-RNTI through a PDCCH to the relay UE 1 611 at operation 653. Exchange of the LTE BSR message, the D2D BSR message, and the resource allocation message may be repeated during a time T 655.

The relay UE 2 612 may transmit an LTE BSR message and a D2D BSR message to the eNB 2 622 at operation 657, and the eNB 2 622 may transmit a resource allocation message including granted data amount, a C-RNTI, and an SL-RNTI through a PDCCH to the relay UE 2 612 in response to the LTE BSR message and the D2D BSR message at operation 659. Exchange of the LTE BSR message, the D2D BSR message, and the resource allocation message may be repeated during a time T 661. Each of the relay UE 1 611 and the relay UE 2 612 broadcasts a load metric value calculated using the data amount requested through the LTE BSR message and the D2D BSR message and the granted data such that a remote UE 1 601 and a remote UE 2 602 may receive the load metric value, so each of the remote UE 1 601 and the remote UE 2 602 may select a relay UE based on a received load metric value and connect to the selected relay UE.

Operations 663 to 677 in FIG. 6 may respectively correspond to operations 463 to 477 in FIG. 4, so a detailed description thereof will be omitted herein.

Still another example of a process of selecting a relay UE in a wireless communication system according to an embodiment of the present disclosure has been described with reference to FIG. 6, and another example of a process of providing relay load information in a wireless communication system according to an embodiment of the present disclosure will be described with reference to FIGS. 7A and 7B.

Another example of a process of providing relay load information based on D2D communication load in a wireless communication system according to an embodiment of the present disclosure will be described with reference to FIG. 7A.

Figure 7A:
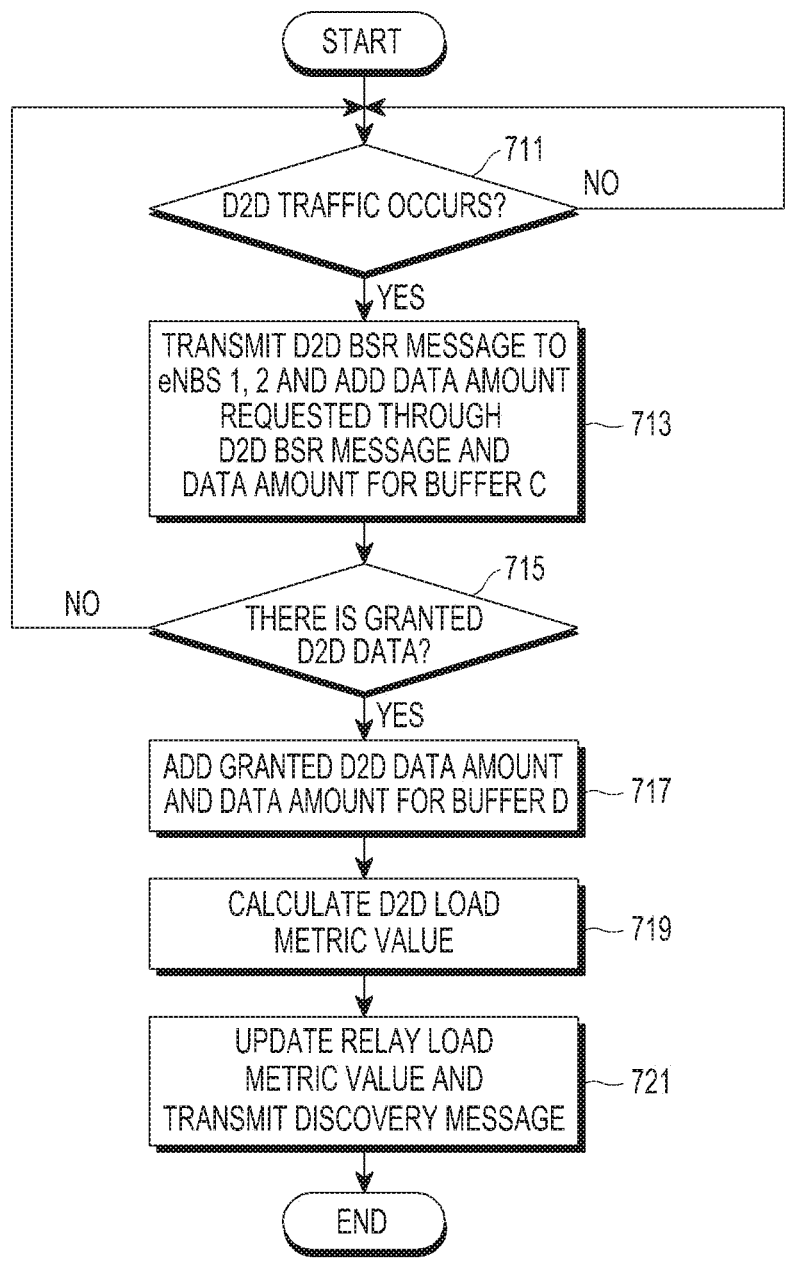
FIG. 7A schematically illustrates another example of a process of providing relay load information based on D2D communication load in a wireless communication system according to an embodiment of the present disclosure.

FIG. 7A schematically illustrates another example of a process of providing relay load information based on D2D communication load in a wireless communication system according to an embodiment of the present disclosure.

Referring to FIG. 7A, a relay UE may determine whether D2D traffic occurs at operation 711.

If the D2D traffic occurs, the relay UE proceeds to operation 713. The relay UE transmits a D2D BSR message to each of an eNB 1 and an eNB 2, and adds data amount requested through the D2D BSR message and data amount for a buffer C at operation 713, and proceeds to operation 715.

The relay UE may broadcast a load metric value which is calculated using D2D data amount which the relay UE requests from the eNB 1 and the eNB 2 and D2D data amount granted by each of the eNB 1 and the eNB 2. Operation related to this, i.e., operations 715 to 721 in FIG. 7 may be respectively similar to operations 515 to 521 in FIG. 5A, so a detailed description thereof will be omitted herein.

Although FIG. 7A illustrates another example of a process of providing relay load information based on D2D communication load in a wireless communication system according to an embodiment of the present disclosure, various changes could be made to FIG. 7A. For example, although shown as a series of operations, various operations in FIG. 7A could overlap, occur in parallel, occur in a different order, or occur multiple times.

Another example of a process of providing relay load information based on D2D communication load in a wireless communication system according to an embodiment of the present disclosure has been described with reference to FIG. 7A, and another example of a process of providing relay load information based on LTE communication load in a wireless communication system according to an embodiment of the present disclosure will be described with reference to FIG. 7B.

Figure 7B:
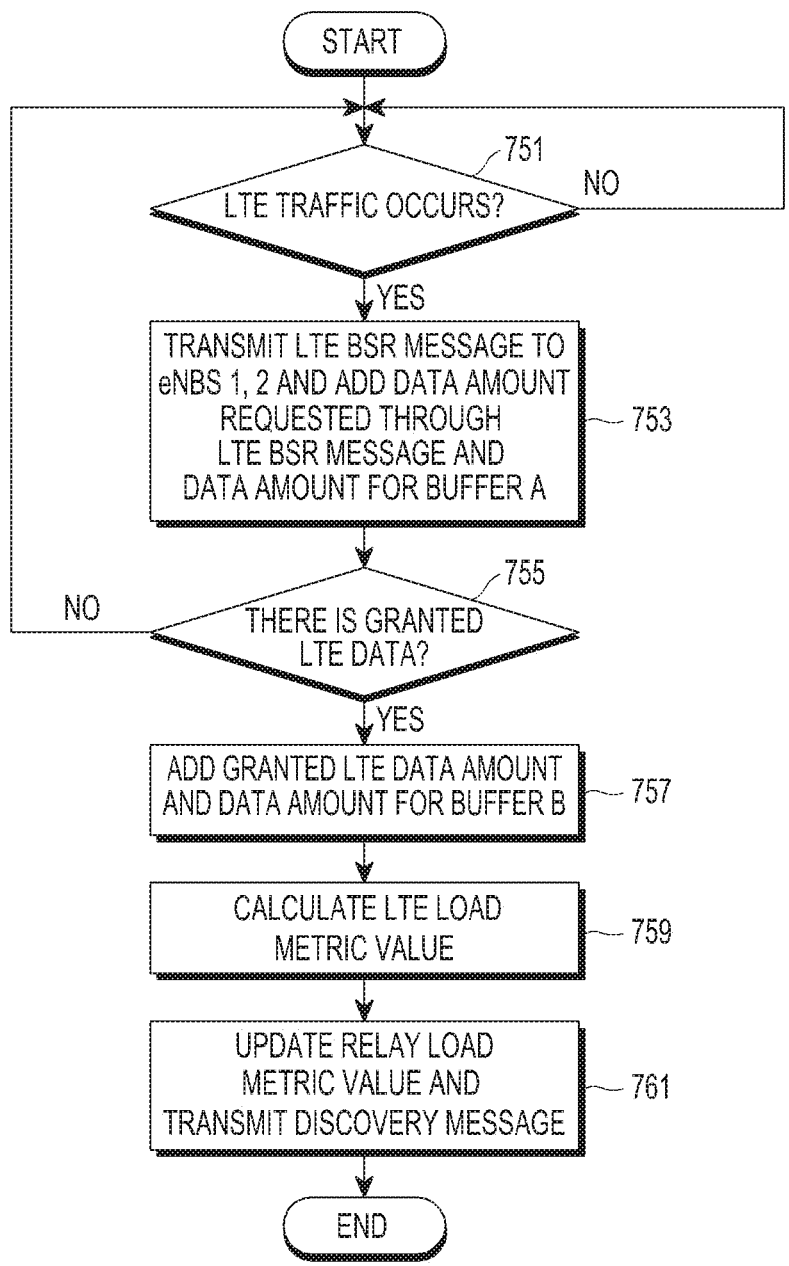
FIG. 7B schematically illustrates another example of a process of providing relay load information based on LTE communication load in a wireless communication system according to an embodiment of the present disclosure.

FIG. 7B schematically illustrates another example of a process of providing relay load information based on LTE communication load in a wireless communication system according to an embodiment of the present disclosure.

Referring to FIG. 7B, a relay UE may determine whether LTE traffic occurs at operation 751.

If the LTE traffic occurs, the relay UE proceeds to operation 753. The relay UE transmits an LTE BSR message to each of an eNB 1 and an eNB 2, and adds data amount requested through the LTE BSR message and data amount for a buffer A at operation 753, and proceeds to operation 755.

The relay UE may broadcast a load metric value which is calculated using LTE data amount which the relay UE requests from the eNB 1 and the eNB 2 and LTE data amount granted by each of the eNB 1 and the eNB 2. Operation related to this, i.e., operations 755 to 761 in FIG. 7 may be respectively similar to operations 555 to 561 in FIG. 5B, so a detailed description thereof will be omitted herein.

Although FIG. 7B illustrates another example of a process of providing relay load information based on LTE communication load in a wireless communication system according to an embodiment of the present disclosure, various changes could be made to FIG. 7B. For example, although shown as a series of operations, various operations in FIG. 7B could overlap, occur in parallel, occur in a different order, or occur multiple times.

Another example of a process of providing relay load information based on LTE communication load in a wireless communication system according to an embodiment of the present disclosure has been described with reference to FIG. 7B, and still another example of a process of selecting a relay UE in a wireless communication system according to an embodiment of the present disclosure will be described with reference to FIGS. 8A and 8B.

Firstly, an example of a process of selecting a relay UE based on LTE communication load and D2D communication load in a wireless communication system according to an embodiment of the present disclosure will be described with reference to FIG. 8A.

Figure 8A:
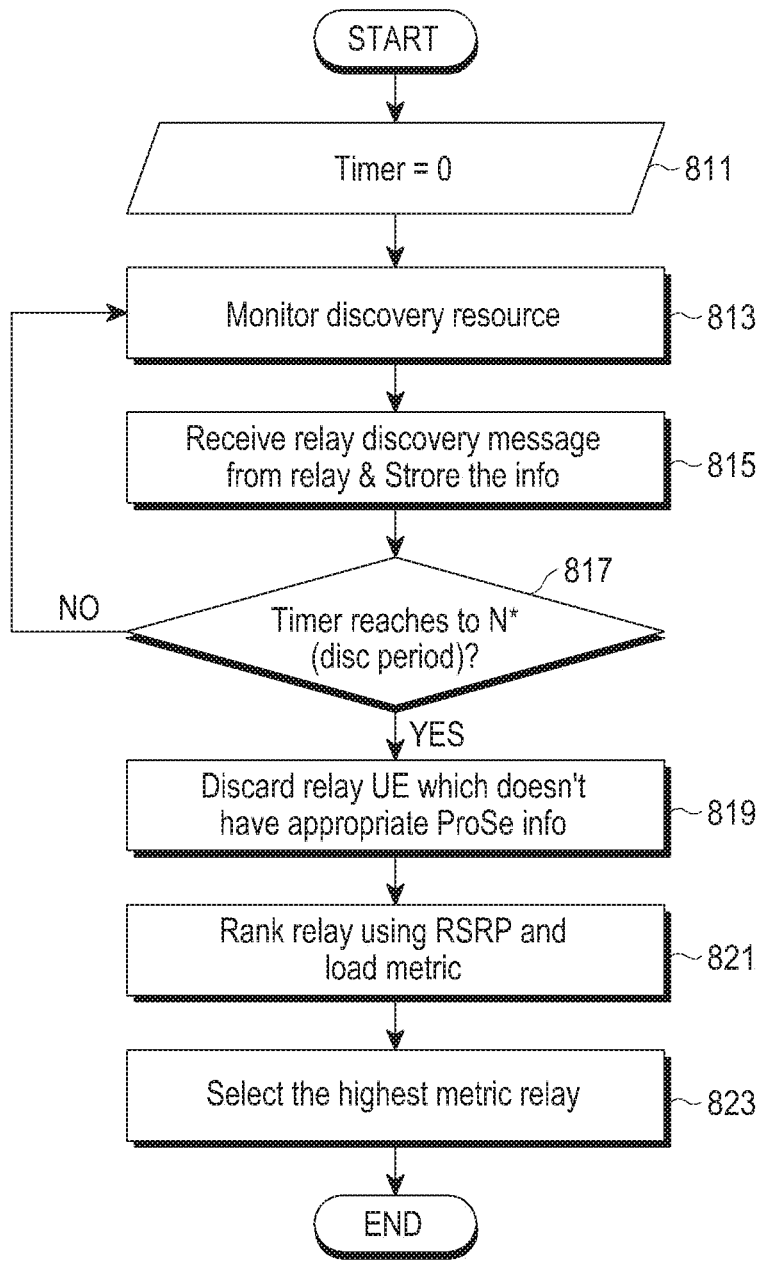
FIG. 8A schematically illustrates an example of a process of selecting a relay UE based on LTE communication load and D2D communication load in a wireless communication system according to an embodiment of the present disclosure.

FIG. 8A schematically illustrates an example of a process of selecting a relay UE based on LTE communication load and D2D communication load in a wireless communication system according to an embodiment of the present disclosure.

Referring to FIG. 8A, it will be noted that a process of selecting a relay UE in FIG. 8A is a process of selecting a relay UE in a case that relay load information received by a remote UE includes a load metric value which is based on all of LTE communication load and D2D communication load.

Firstly, a remote UE may initialize a timer at operation 811.

The remote UE may monitor a discovery resource during a set time at operation 813.

Here, the discovery resource may be, for example, a relay discovery message. Upon receiving a relay discovery message from each of relay candidate UEs, the remote UE may store relay load information included in the relay discovery message at operation 815.

If the received relay discovery message does not include appropriate ProSe information, the remote UE may immediately perform the next operation without decoding the received relay discovery message and storing the relay load information.

The remote UE may determine whether the timer reaches the set time at operation 817. The set time may be, for example, an integer multiple (N) of a discovery period of the remote UE stored at a universal integrated circuit card (UICC). The remote UE needs to receive relay load information at least one time, so the set time may be longer than a maximum discovery period of a relay candidate UE.

If the timer reaches the set time, the remote UE proceeds to operation 819. The remote UE may discard a relay candidate UE which does not have appropriate ProSe information required for a proximity communication between UEs from among the relay candidate UEs at operation 819. That is, the remote UE may exclude the relay candidate UE which does not have the appropriate ProSe information required for the proximity communication between the UEs from the relay candidate UEs. That is, the remote UE may exclude a relay UE transmitting a discovery message which does not correspond to a relay service code or accord with the relay service code from the relay candidate UEs.

The remote UE may determine a rank of the relay candidate UEs using a load metric value included in the relay load information at operation 821. Here, the load metric value may be a load metric value which is determined by considering all of LTE communication load and D2D communication load. The load metric value may be, for example, a mean of load metric values received during a set time. At this time, N in operation 817 may be used for calculating a mean of accumulated values of load metrics received during the set time.

Meanwhile, the remote UE may select a relay UE which will provide a relay service using an RSRP value indicating link quality along with a load metric value. For example, the remote UE may sort a rank of relay candidate UEs of which RSRP values are great in ascending order of RSRP value. That is, the remote UE may sort the relay candidate UEs in ascending order RSRP value/load metric value, or in descending order load metric value/RSRP value.

In this case, at least one of RSRQ, an SNR, an SINR, and an RSSI as well as RSRP may be used as a value indicating link quality, and a determined coefficient for scaling may be applied to a load metric value and an RSRP value.

The remote UE may select a relay candidate UE of which a rank is the highest from among the relay candidate UEs as a relay UE which will perform a relay service at operation 823.

Although FIG. 8A illustrates an example of a process of selecting a relay UE based on LTE communication load and D2D communication load in a wireless communication system according to an embodiment of the present disclosure, various changes could be made to FIG. 8A. For example, although shown as a series of operations, various operations in FIG. 8A could overlap, occur in parallel, occur in a different order, or occur multiple times.

An example of a process of selecting a relay UE based on LTE communication load and D2D communication load in a wireless communication system according to an embodiment of the present disclosure has been described with reference to FIG. 8A, and another example of a process of selecting a relay UE based on LTE communication load and D2D communication load in a wireless communication system according to an embodiment of the present disclosure will be described with reference to FIG. 8B.

Figure 8B:
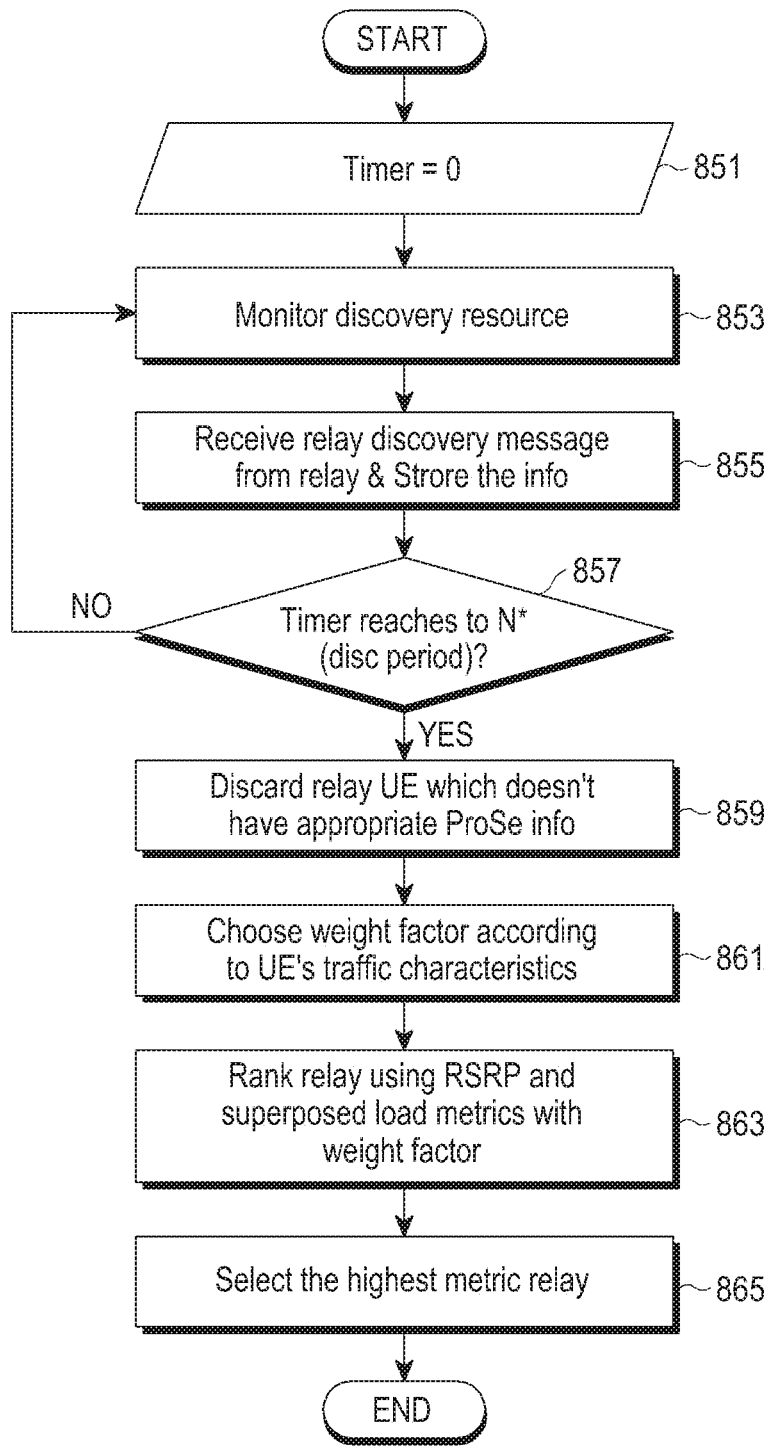
FIG. 8B schematically illustrates another example of a process of selecting a relay UE based on LTE communication load and D2D communication load in a wireless communication system according to an embodiment of the present disclosure.

FIG. 8B schematically illustrates another example of a process of selecting a relay UE based on LTE communication load and D2D communication load in a wireless communication system according to an embodiment of the present disclosure.

Referring to FIG. 8B, it will be noted that a process of selecting a relay UE in FIG. 8B is a process of selecting a relay UE in a case that relay load information received by a remote UE includes a load metric value for each of LTE communication load and D2D communication load.

Firstly, a remote UE may initialize a timer at operation 851.

The remote UE may monitor a discovery resource during a set time at operation 853. Here, the discovery resource may be, for example, a relay discovery message. Upon receiving a relay discovery message from each of relay candidate UEs, the remote UE may store relay load information included in the relay discovery message at operation 855.

If the received relay discovery message does not include appropriate ProSe information, the remote UE may immediately perform the next operation without decoding the received relay discovery message and storing the relay load information.

The remote UE may determine whether the timer reaches the set time at operation 857.

If the timer reaches the set time, the remote UE may exclude a relay candidate UE which does not have the appropriate ProSe information from the relay candidate UEs which transmit the relay discovery messages at operation 859.

The remote UE may determine a weight to be applied to LTE communication load and D2D communication load based on a traffic characteristic of the remote UE at operation 861. For example, the remote UE may determine the traffic characteristic based on an ID of a logical channel through which data is transmitted, a quality of service class identifier (QCI), 5-tuple={source internet protocol (IP) address, destination IP address, source port number, destination port number, transport protocol} as 5-tuple information of an IP layer, and/or the like.

The remote UE may apply a weight to each of an LTE load metric value and a D2D load metric value according to a traffic characteristic to sort a rank of the relay candidate UEs at operation 863.

The remote UE may select a relay candidate UE of which a rank is the highest from among the relay candidate UEs as a relay UE which will perform a relay service at operation 865.

Although FIG. 8B illustrates another example of a process of selecting a relay UE based on LTE communication load and D2D communication load in a wireless communication system according to an embodiment of the present disclosure, various changes could be made to FIG. 8B. For example, although shown as a series of operations, various operations in FIG. 8B could overlap, occur in parallel, occur in a different order, or occur multiple times.

Another example of a process of selecting a relay UE based on LTE communication load and D2D communication load in a wireless communication system according to an embodiment of the present disclosure has been described with reference to FIG. 8B, and an example of a process of reselecting a relay UE in a wireless communication system according to an embodiment of the present disclosure will be described with reference to FIG. 9.

Figure 9:
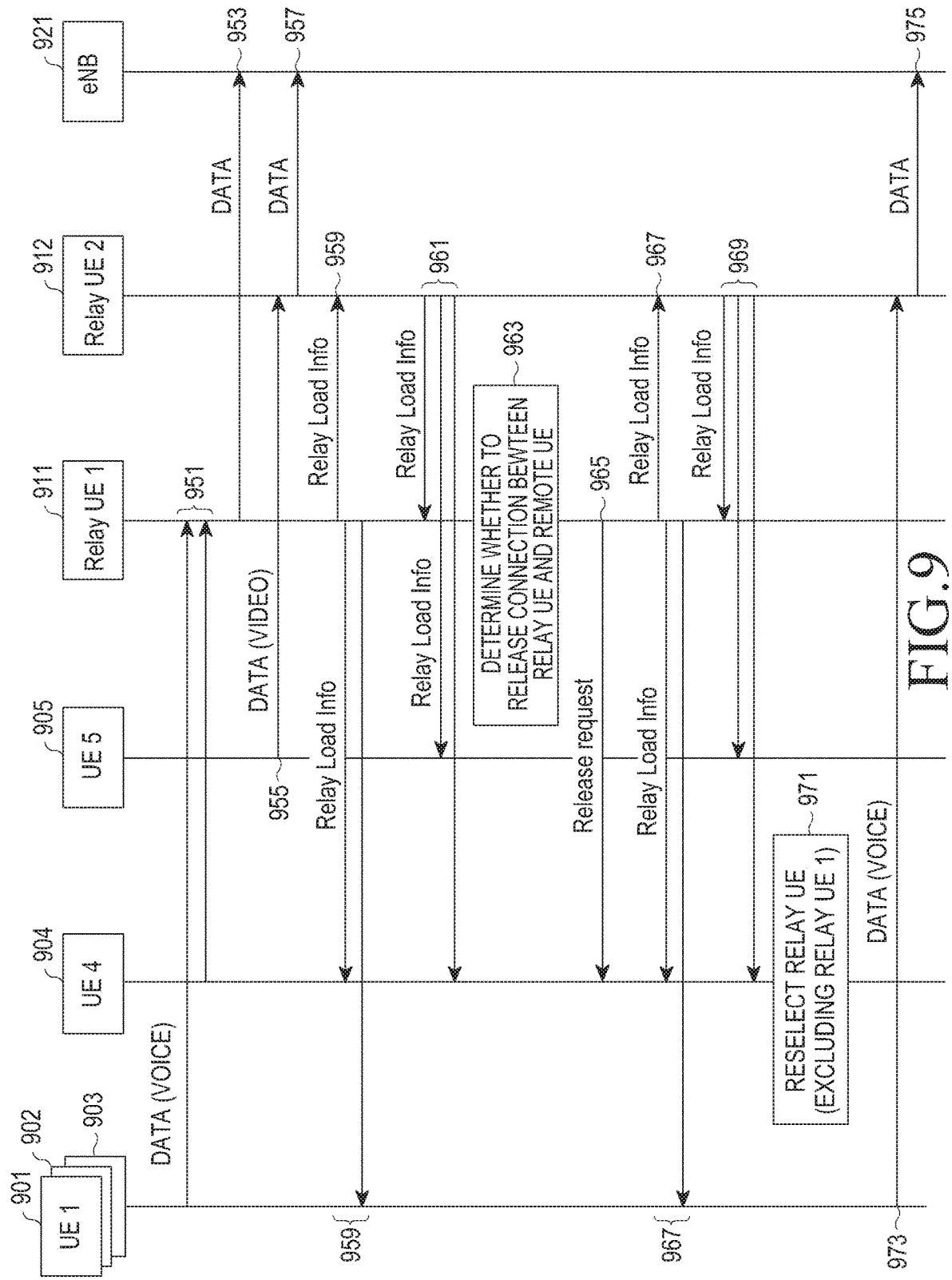
FIG. 9 schematically illustrates an example of a process of reselecting a relay UE in a wireless communication system according to an embodiment of the present disclosure.

FIG. 9 schematically illustrates an example of a process of reselecting a relay UE in a wireless communication system according to an embodiment of the present disclosure.

Referring to FIG. 9, if a remote UE 1 901 to a remote UE 4 904 transmit data to a relay UE 1 911 at operation 951, the relay UE 1 911 may transmit, to an eNB 921, data received from each of the remote UE 1 901 to the remote UE 4 904 at operation 953.

If a remote UE 5 905 transmits data to a relay UE 2 912 at operation 955, the relay UE 2 912 may transmit, to the eNB 921, data received from the remote UE 5 905 at operation 957.

Each of the relay UE 1 911 and the relay UE 2 912 may broadcast a discovery message including relay load information. For example, the relay UE 1 911 may broadcast a discovery message including relay load information such that the remote UE 1 901 to the remote UE 4 904 and the relay UE 2 912 may receive the discovery message at operation 959, and the relay UE 2 912 may broadcast a discovery message including relay load information such that the remote UE 4 904 and the remote UE 5 905, and the relay UE 1 911 may receive the discovery message at operation 961.

The relay UE 1 911 may determine whether to release a connection between the relay UE 1 911 and a remote UE connected to the relay UE 1 911 by comparing relay road information received from the relay UE 2 912 and relay road information of the relay UE 1 911 at operation 963. For example, if a load metric value included in relay road information received from the relay UE 2 912 is less than or equal to a load metric value of the relay UE 1 911, the relay UE 1 911 may determine whether to release a connection between the relay UE 1 911 and a remote UE connected to the relay UE 1 911.

If the relay UE 1 911 determines to release a connection between the relay UE 1 911 and the remote UE 4 904, the relay UE 1 911 may transmit a connection release request to the remote UE 4 904 at operation 965.

After the connection between the relay UE 1 911 and the remote UE 4 904 is released, the relay UE 1 911 may broadcast a discovery message including updated relay load information such that the remote UE 1 901 to the remote UE 4 904 and the relay UE 2 912 may receive the discovery message at operation 967. The relay UE 2 912 may broadcast a discovery message including updated relay load information such that the remote UE 4 904 and the remote UE 5 905, and the relay UE 1 911 may receive the discovery message at operation 969.

After receiving the discovery message from each of the relay UE 1 911 and the relay UE 2 912, the remote UE 4 904 may reselect a relay UE based on relay load information included in the discovery message at operation 971. For example, the remote UE 4 904 may select a remote UE which provides a load metric value with the highest rank as a relay UE based on a load metric value included in relay load information. In this case, the remote UE 4 904 may select the relay UE from among relay candidate UEs excluding a relay candidate UE which requests to release a connection.

After determining the relay UE 2 912 as the relay UE, the remote UE 4 904 may transmit data to the relay UE 2 912 at operation 973, and the relay UE 2 912 may transmit the data received from the remote UE 4 904 to the eNB 921 at operation 975. Here, the data may be, for example, voice data.

An example of a process of reselecting a relay UE in a wireless communication system according to an embodiment of the present disclosure has been described with reference to FIG. 9, and an environment in which a relay UE is reselected in a wireless communication system according to an embodiment of the present disclosure will be described with reference to FIG. 10.

Figure 10:
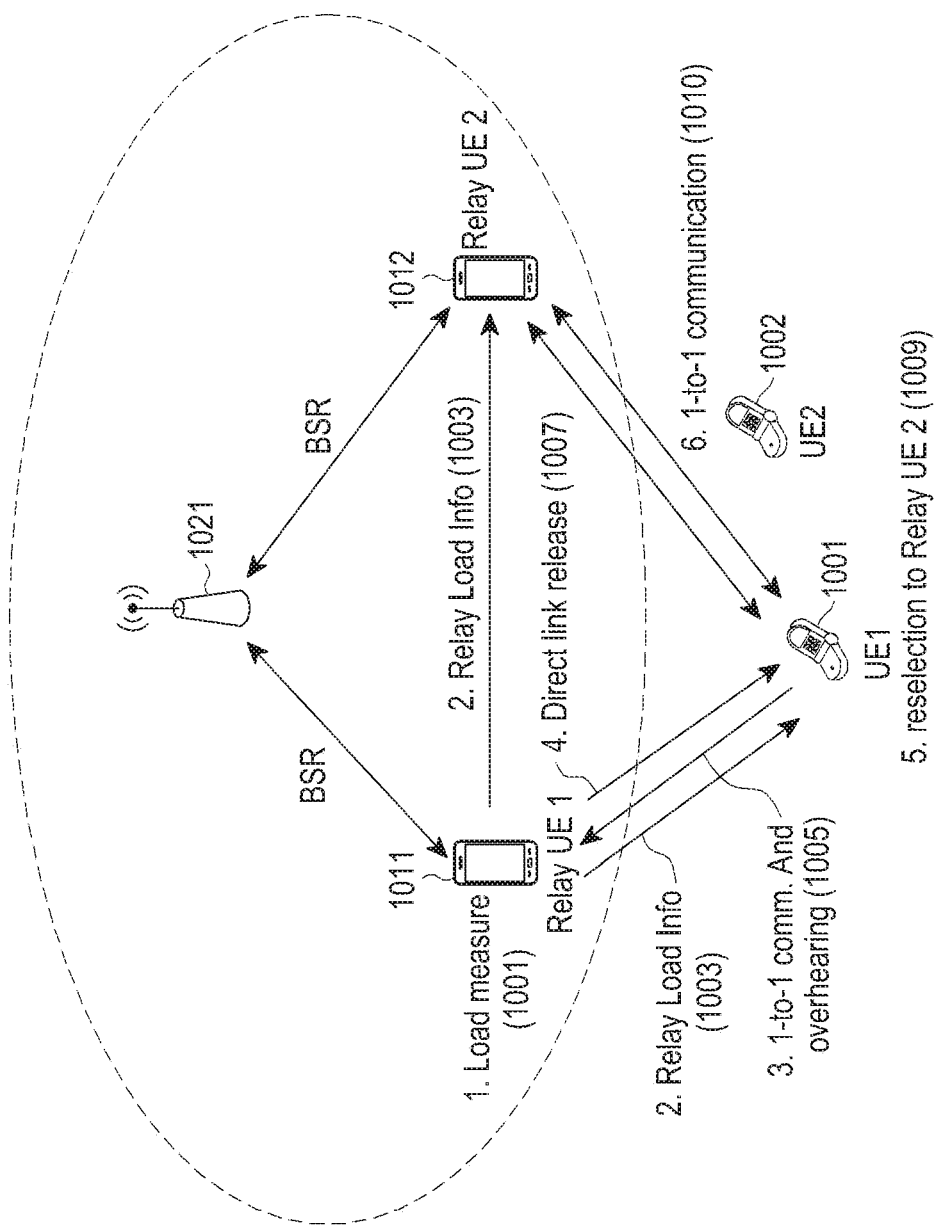
FIG. 10 schematically illustrates an environment in which a relay UE is reselected in a wireless communication system according to an embodiment of the present disclosure.

FIG. 10 schematically illustrates an environment in which a relay UE is reselected in a wireless communication system according to an embodiment of the present disclosure.

Referring to FIG. 10, load balancing may be performed through information sharing between a relay UE 1 1011 and a relay UE 2 1012. Here, the relay UE 1 1011 and a relay UE 2 1012 may be in communication with an eNB 1021.

The relay UE 1 1011 may measure communication load of the relay UE 1 1011, and the relay UE 2 1012 may measure communication load of the relay UE 2 1012 at operation 1001.

Each of the relay UE 1 1011 and the relay UE 2 1012 may broadcast relay load information including measured communication load at operation 1003. In this case, each of a remote UE 1 1001 and a remote UE 2 1002 may determine a relay UE which will provide a relay service to each of the remote UE 1 1001 and the remote UE 2 1002 by overhearing a metric value, e.g., an RSRP value and a load metric value, indicating link quality of each of the relay UE 1 1011 and the relay UE 2 1012, and perform a one-to-one communication with the determined relay UE at operation 1005.

Here, each of the relay UE 1 1011 and the relay UE 2 1012 may compare relay load of each of the relay UE 1 1011 and the relay UE 2 1012 with relay load of other UE, e.g., the other party relay UE. For example, each of the relay UE 1 1011 and the relay UE 2 1012 may acquire a MAC protocol data unit (PDU) by decoding a scheduling assignment (SA) message of the other party relay UE. Each of the relay UE 1 1011 and the relay UE 2 1012 may measure D2D traffic between a relay UE and a remote UE by extracting, from a header, a source ID and a destination ID related to a relay service of the other party relay UE. Here, the source ID may include a ProSe UE ID of a remote UE to which the relay UE provides a relay service, and the destination ID may include a ProSe Relay UE ID of the remote UE to which the relay service is provided.

For example, the relay UE 1 1011 compares relay load of the relay UE 1 1011 with relay load of the relay UE 2 1012 which is located nearby the relay UE 1 1011, and the relay UE 1 1011 may determine whether a relay service code of the remote UE 1 1001 determined as a discard target UE is identical to a relay service code of the relay UE 1 1011 if the relay load of the relay UE 1 1011 is greater than the relay load of the relay UE 2 1012. Here, the discard target UE denotes, for example, a UE which will be not selected as a relay candidate UE.

If the relay service code of the remote UE 1 1001 is identical to the relay service code of the relay UE 1 1011, the relay UE 1 1011 may request connection release for a direct link from the remote UE 1 1001 at operation 1007.

After releasing a connection between the relay UE 1 1011 and the remote UE 1 1001, the remote UE 1 1001 may select the relay UE 2 1012 as a UE which will perform a relay service with the remote UE 1 1001 at operation 1009. Here, the relay UE 1 1011 for which connection release is requested may be excluded from relay candidate UEs.

After the relay UE 2 1012 is selected, that is, after a relay UE for the remote UE 1 1001 is reselected, the remote UE 1 1001 may perform a one-to-one communication with the relay UE 2 1012 at operation 1010.

An environment in which a relay UE is reselected in a wireless communication system according to an embodiment of the present disclosure has been described with reference to FIG. 10, and another example of a process of reselecting a relay UE in a wireless communication system according to an embodiment of the present disclosure will be described with reference to FIG. 11.

Figure 11:
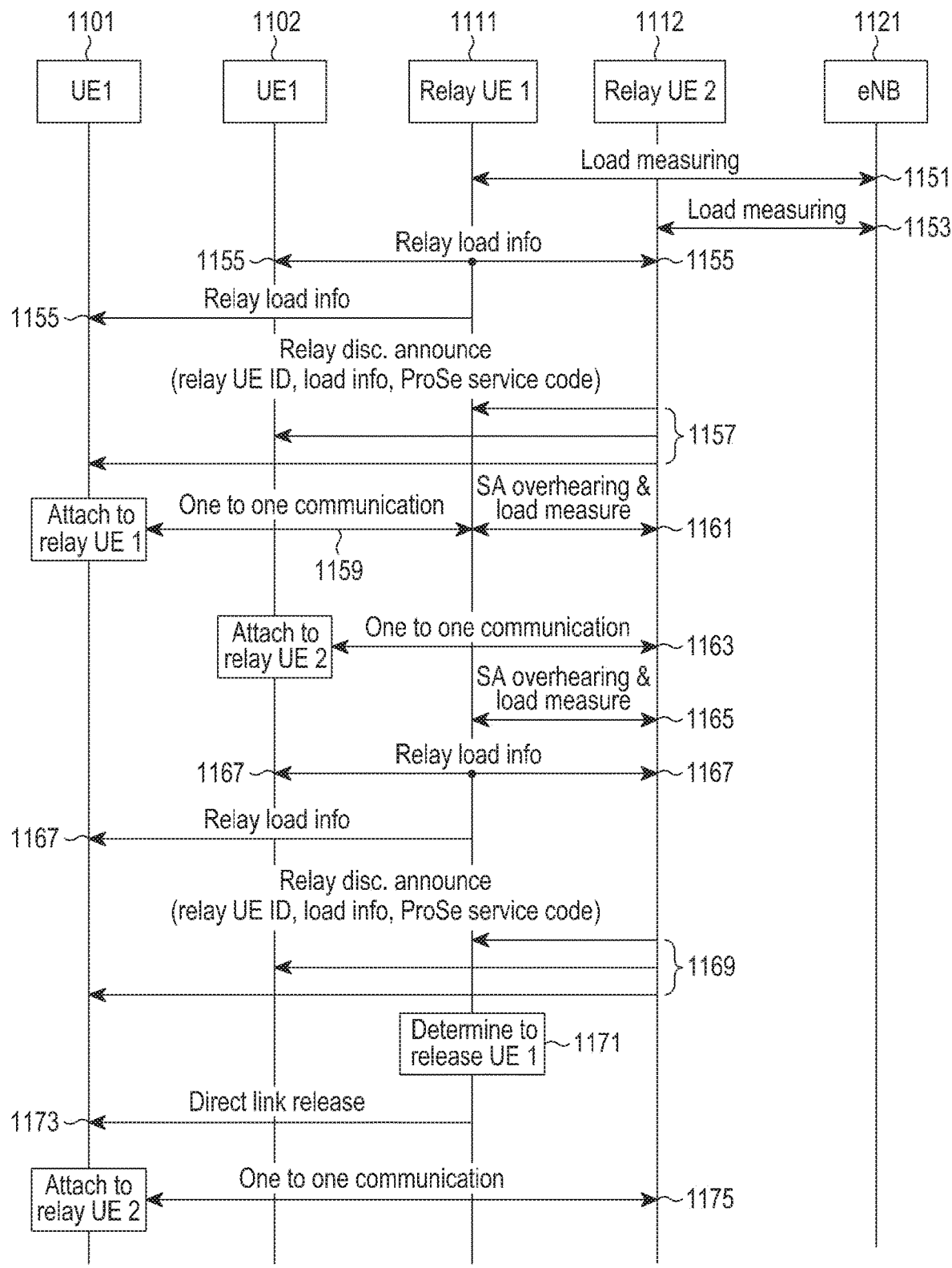
FIG. 11 schematically illustrates another example of a process of reselecting a relay UE in a wireless communication system according to an embodiment of the present disclosure.

FIG. 11 schematically illustrates another example of a process of reselecting a relay UE in a wireless communication system according to an embodiment of the present disclosure.

Referring to FIG. 11, a relay UE 1 1111 may measure cellular communication load between an eNB 1121 and the relay UE 1 1111 at operation 1151. A relay UE 2 1112 may measure cellular communication load between the eNB 1121 and the relay UE 2 1112 at operation 1153. The relay UE 1 1111 may broadcast a discovery message including relay load information about the measured cellular communication load such that a remote UE 1 1101, a remote UE 2 1102, and the relay UE 2 1112 may receive the discovery message at operation 1155. The relay UE 2 1112 may broadcast a discovery message including relay load information about the measured cellular communication load such that the remote UE 1 1101, the remote UE 2 1102, and the relay UE 1 1111 may receive the discovery message at operation 1157.

If the remote UE 1 1101 determines the relay UE 1 1111 as a UE which will perform a relay service with the remote UE 1 1101, the relay UE 1 1111 may perform a one-to-one communication with the remote UE 1 1101 at operation 1159. Each of the relay UE 1 1111 and the relay UE 2 1112 may overhear an SA message of the other party relay UE, and compare cellular communication load of each of the relay UE 1 1111 and the relay UE 2 1112 with cellular communication load of the other party relay UE at operation 1161.

If the remote UE 2 1102 determines the relay UE 2 1112 as a UE which will perform a relay service with the remote UE 2 1102, the relay UE 2 1112 may perform a one-to-one communication with the remote UE 2 1102 at operation 1163. Each of the relay UE 1 1111 and the relay UE 2 1112 may overhear an SA message of the other party relay UE, and compare cellular communication load of each of the relay UE 1 1111 and the relay UE 2 1112 with cellular communication load of the other party relay UE at operation 1165.

The relay UE 1 1111 may broadcast a discovery message including updated relay load information about cellular communication load and D2D communication load such that the remote UE 1 1101, the remote UE 2 1102, and the relay UE 2 1112 may receive the discovery message at operation 1167. The relay UE 2 1112 may broadcast a discovery message including updated relay load information about cellular communication load and D2D communication load such that the remote UE 1 1101, the remote UE 2 1102, and the relay UE 1 1111 may receive the discovery message at operation 1169.

The relay UE 1 1111 compares relay load of the relay UE 1 1111 with relay load of the relay UE 2 1112 which is located nearby the relay UE 1 1111. If the relay load of the relay UE 1 1111 is greater than the relay load of the relay UE 2 1112, the relay UE 1 1111 may determine the remote UE 1 1101 as a connection release target UE which will release a connection with the relay UE 1 1111 at operation 1171.

The relay UE 1 1111 may request connection release for a direct link from the remote UE 1 1101 at operation 1173. So, a connection between the remote UE 1 1101 and the relay UE 1 1111 is released, so the remote UE 1 1101 may select the relay UE 2 1112 as a UE which will perform a relay service with the relay UE 1 1111.

After the relay UE 2 1112 is selected, that is, after a relay UE for the remote UE 1 1101 is reselected, a one-to-one communication between the remote UE 1 1101 and the relay UE 2 1112 may be performed at operation 1175.

Meanwhile, a case that a remote UE reselects a relay UE may be a case that a metric value, e.g., an RSRP value, indicating link quality of a relay UE connected to the remote UE is less than or equal to a set threshold value, a case that ProSe service information, e.g., a relay service code, UE user information, and/or the like, included in a discovery message transmitted by the relay UE is changed, or different from information which is provisioned in advance as well as a case that the remote UE receives rejection or connection release request from the relay UE.

Further, a remote UE may set a minimum connection timer. For example, if the remote UE selects a relay UE and sets up a connection with the selected relay UE, the remote UE does not need to perform a relay UE reselecting operation during the minimum connection timer. For example, a value of the minimum connection timer may be determined as a value which is generated by adding a random part to a period longer than a period at which a relay discovery message is transmitted.

The remote UE may apply a margin to load metric values transmitted by relay candidate UEs. For example, the remote UE compares a load metric value of a relay UE connected to the remote UE with load metric values of other relay candidate UEs, and does not need to perform a relay UE reselecting operation if a difference among a margin of the load metric value of the relay UE connected to the remote UE and margins of the load metric values of the other relay candidate UEs is less than or equal to a set threshold value.

Meanwhile, if a remote UE wants to sensitively respond to the newest relay load information rather than burden of ping pong procedure according to relay UE reselection, the remote UE may set a relatively small value, e.g., a value which is less than or equal to a threshold value.

Another example of a process of reselecting a relay UE in a wireless communication system according to an embodiment of the present disclosure has been described with reference to FIG. 11, and an effect of a load metric in a wireless communication system according to an embodiment of the present disclosure will be described with reference to FIGS. 12A, 12B, 12C, and 12D.

FIGS. 12A, 12B, 12C, and 12D schematically illustrate an effect of a load metric in a wireless communication system according to an embodiment of the present disclosure.

Figures 12A, 12B:
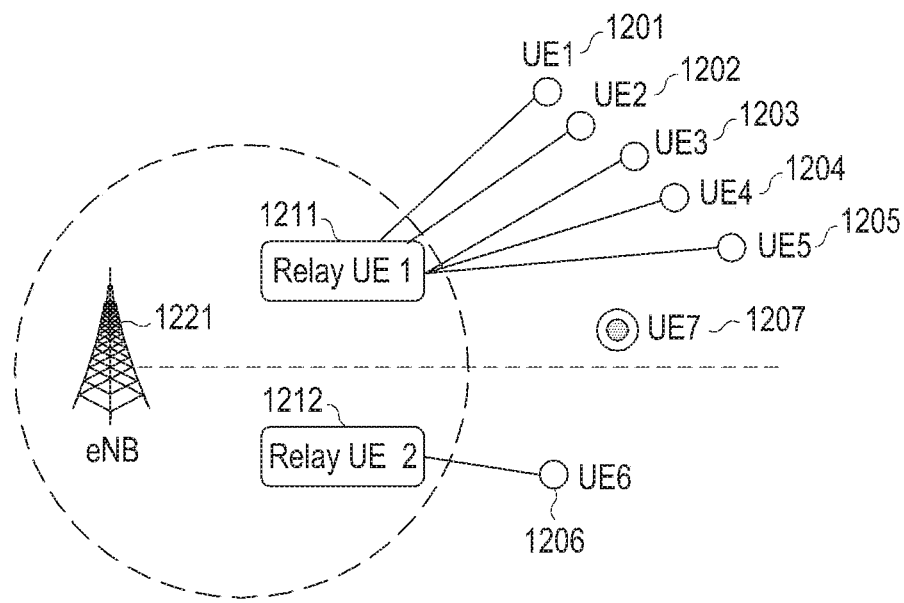
FIGS. 12A, 12B, 12C, and 12D schematically illustrate an effect of a load metric in a wireless communication system according to an embodiment of the present disclosure.

Referring to FIG. 12A, an environment of a wireless communication system where a load metric is used is shown. As shown in FIG. 12A, a remote UE 1 1201 to a remote UE 5 1205 may communicate with an eNB 1221 through a relay UE 1 1211, and a remote UE 6 1206 may communicate with the eNB 1221 through a relay UE 2 1212.

In this situation, eight scenarios may be assumed as shown in FIG. 12B. In each scenario, a column 1 1251 indicates cellular communication load, a column 2 1252 indicates D2D communication load, a column 3 1253 indicates traffics of a remote UE 1 1201 to a remote UE 5 1205, and a column 4 1254 indicates traffic of a remote UE 6 1206. Here, traffic may include at least one of voice traffic and video traffic. The voice traffic is two-way traffic, and a bandwidth for a UL may be similar to a bandwidth for a DL in the voice traffic. The video traffic is one-way traffic, and a bandwidth for a UL may be greater than a bandwidth for a DL in the video traffic.

In this case, a UE 7 1207 may request a relay service. The UE 7 1207 may select a relay UE which will provide a relay service to the UE 7 1207 from a relay UE 1 1211 and a relay UE 2 1212 by considering a load metric.

Figures 12C, 12D:

Referring to FIG. 12C, a process of selecting a relay UE using an existing load metric according to an embodiment of the present disclosure is shown. Referring to FIG. 12D, a process of selecting a relay UE using a load metric according to an embodiment of the present disclosure is shown.

According to an existing load metric in FIG. 12C, a UE 7 1207 may consider an RSRP value and the number of connected remote UEs per relay UE in order to select a relay UE.

In a case that the UE 7 1207 considers the RSRP value, in situations such as scenarios 1 to 8 in FIG. 12B, the UE 7 1207 may select a relay UE 1 1211 as a relay UE which will perform a relay service with the UE 7 1207. In this case, a communication quality degradation such as communication delay, communication release, and/or the like may occur in scenarios 2, 4, 6, and 7.

If the UE 7 1207 selects a relay UE by considering the number of connected remote UEs per relay UE, the UE 7 1207 may select the relay UE 2 1212. In this case, a communication quality degradation may occur in situations such as scenarios 3, 4, 7, and 8.

That is, according to an existing load metric, load according to a traffic type is not considered, so an issue such as communication quality degradation, and/or the like may occur in a specific scenario.

According to a new load metric according to an embodiment of the present disclosure as shown in FIG. 12D, a relay UE which is appropriate per scenario, that is, a relay UE which is optimal per scenario may be determined.

For example, in the scenarios 1 and 5, the UE 7 1207 determines that resources for all of the relay UE 1 1211 and the relay UE 2 1212 are sufficient, so the UE 7 1207 may be connected to any one of the relay UE 1 1211 and the relay UE 2 1212.

In the scenarios 2, 3, 6, and 8, the UE 7 1207 may be connected to the relay UE 2 1212, the relay UE 1 1211, the relay UE 2 1212, and the relay UE 1 1211, respectively, according to a load metric value which is generated by considering cellular communication load and D2D communication load together.

In the scenarios 4 and 7, the UE 7 1207 may determine a UE which will perform a relay service according to a value superposed by applying a weight to a load metric value which is generated by considering cellular communication load and D2D communication load separately.

As described in FIGS. 12A, 12B, 12C, and 12D, if an existing load metric is used, identify load according to a traffic characteristic of a remote UE may not be identified, however, a relay UE to be connected to a remote UE may be selected by considering the traffic characteristic of the remote UE if a new load metric according to an embodiment of the present disclosure is used.

That is, if an existing load metric is used, a relay UE is selected based on RSRP and the number of connected remote UEs per relay UE, so there is limitation on reflecting a situation of a remote UE according to a traffic characteristic. However, if a new load metric according to an embodiment of the present disclosure is, a remote UE may select an optimal relay UE by applying different weights to cellular communication load and D2D communication load according to a traffic characteristic of the remote UE.

An effect of a load metric in a wireless communication system according to an embodiment of the present disclosure has been described with reference to FIGS. 12A, 12B, 12C, and 12D, and an inner structure of a UE in a wireless communication system according to an embodiment of the present disclosure will be described with reference to FIG. 13.

Figure 13:
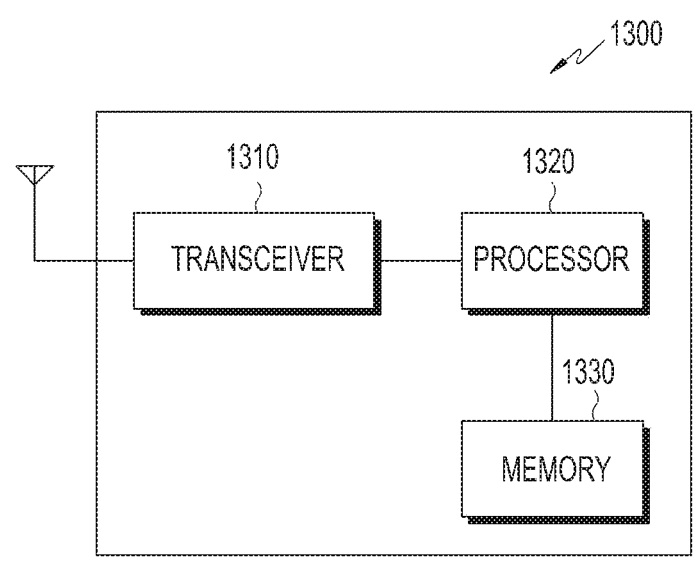
FIG. 13 schematically illustrates an inner structure of a UE in a wireless communication system according to an embodiment of the present disclosure.

FIG. 13 schematically illustrates an inner structure of a UE in a wireless communication system according to an embodiment of the present disclosure.

Referring to FIG. 13, a UE 1300 includes a transceiver 1310, a processor 1320, and a memory 1330.

Components included in the UE 1300 may correspond to components included in each of a communication UE, a remote UE, and a relay UE as described above.

Here, the term unit, and/or the like denotes a component of processing at least one function or operation, and may be implemented with a hardware, a software, or a combination of a hardware and a software.

The transceiver 1310 performs functions for receiving a signal through a wireless channel. The transceiver 1310 may include a transceiver for transmitting and receiving a signal. For example, the transceiver 1310 may perform a function of receiving a radio frequency (RF) signal, a frequency converting function, a demodulating function, a decoding function, a function of removing a cyclic prefix (CP), a fast Fourier transform (FFT) function, a channel estimating function, an equalizing function, and/or the like. The transceiver 1310 may further perform a function of transmitting a signal processed in the processor 320 to another node.

The transceiver included in the transceiver 1310 may transmit a signal to an eNB or another UE or receive a signal from the eNB or the other UE.

In an embodiment of the present disclosure, if the transceiver 1310 is included in a remote UE, the transceiver 1310 of the remote UE may acquire relay load information from each of a plurality of relay candidate UEs.

The transceiver 1310 of the remote UE may perform a relay communication with a relay UE selected from among the plurality of relay candidate UEs.

In another embodiment of the present disclosure, if the transceiver 1310 is included in a relay UE, the transceiver 1310 included in the relay UE may broadcast a discovery message including relay load information such that a remote UE may receive the discovery message. Further, the transceiver 1310 included in the relay UE may communicate with a remote UE which requests a connection based on the discovery message.

The processor 1320 controls the overall operation of the UE 1300. For example, the processor 1320 receives a signal through the transceiver 1310. The processor 1320 records data at the memory 1330, or reads data from the memory 1330. For this, the processor 1320 may include at least one of a processor, microprocessor, and a microcontroller, or may be implemented as a part of a processor.

If the processor 1320 is included in a remote UE, the processor 1320 included in the remote UE may select a relay UE which will perform a relay communication with the remote UE based on relay load information acquired through the transceiver 1310, and perform the relay communication with the selected relay UE using the transceiver 1310. Here, relay load information may be information generated based on cellular communication load between a relay candidate UE and an eNB connected to the relay candidate UE.

Meanwhile, cellular communication load may be determined according to UL data amount granted from an eNB. The cellular communication load may be determined according to amount of data to be transmitted to the eNB which is buffered at a UL buffer.

Further, relay load information may be determined based on a traffic characteristic of a relay candidate UE. The relay load information may be information generated based on cellular communication load and D2D communication load between the relay candidate UE and a remote UE connected to the relay candidate UE.

If the processor 1320 is included in a relay UE, the processor 1320 included in the relay UE may measure cellular communication load between the relay UE and an eNB connected to the relay UE and generate relay load information which is based on the measured cellular communication load. The processor 1320 may broadcast the generated relay load information using the transceiver 1310.

The processor 1320 may measure D2D communication load between the relay UE and a remote UE connected to the relay UE and generate relay load information which is based on the measured cellular communication load and D2D communication load. The processor 1320 may broadcast the generated relay load information using the transceiver 1310.

The memory 1330 stores a basic program for an operation of the UE 1300, an application program, data such as setting information, and/or the like. For example, the memory 1330 performs functions for storing data processed in the processor 1320. The memory 1330 may include a volatile memory, a non-volatile memory, a combination of the volatile memory and the non-volatile memory, and/or the like. For example, the memory 1330 may include a random access memory (RAM), a flash memory, and/or the like.

The memory 1330 may store load metric according to an embodiment of the present disclosure. The memory 1330 may store a load metric value which is generated based on the load metric and relay load information including the load metric value.

While the transceiver 1310, the processor 1320, and the memory 1330 are described in the UE 1300 as separate units, it is to be understood that this is merely for convenience of description. In other words, two or more of the transceiver 1310, the processor 1320, and the memory 1330 may be incorporated into a single unit. The UE 1300 may further include additional components as well as the transceiver 1310, the processor 1320, and the memory 1330.

An inner structure of a UE in a wireless communication system according to an embodiment of the present disclosure has been described with reference to FIG. 13, and examples of an operating process of a relay UE in a wireless communication system according to an embodiment of the present disclosure will be described with reference to FIGS. 14A and 14B.

Firstly, an operating process of a relay UE in a case that a load metric value is calculated in an application processor (AP) in a wireless communication system according to an embodiment of the present disclosure will be described with reference to FIG. 14A.

Figure 14A:
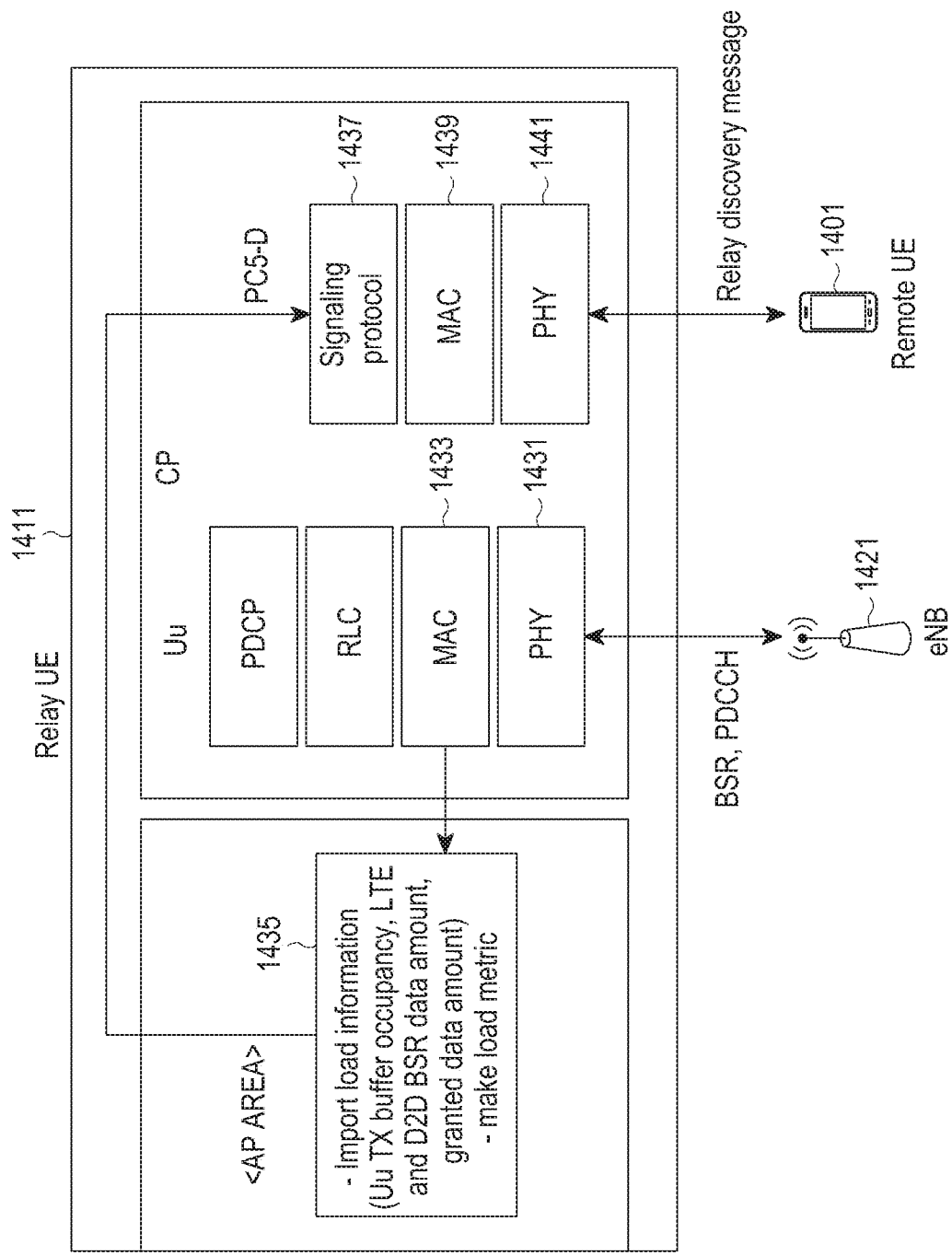
FIG. 14A schematically illustrates an operating process of a relay UE in a case that a load metric value is calculated in an application processor (AP) in a wireless communication system according to an embodiment of the present disclosure.

FIG. 14A schematically illustrates an operating process of a relay UE in a case that a load metric value is calculated in an AP in a wireless communication system according to an embodiment of the present disclosure.

Referring to FIG. 14A, an AP may be a universal processor which may perform a calculating operation or a data processing operation by running one or more programs stored at a memory.

In FIG. 14A, a relay UE 1411 may communicate with a remote UE 1401 through a PC5 interface, and communicate with an eNB 1421 through a Uu interface.

The relay UE 1411 may receive a resource allocation message including resource allocation information about a resource which the eNB 1421 allocates for the relay UE 1411 through a PDCCH in response to a BSR message which the relay UE 1411 transmits to the eNB 1421 through a PHY layer 1431.

When the received resource allocation message is transferred from the PHY layer 1431 to a MAC layer 1433, an AP may import information required for calculating a load metric value to an AP area 1435 through an application program interface (API) registered at a modulator/de-modulator (MODEM) stack. The AP may calculate a load metric value based on imported data capacity of a Uu TX buffer, data amount requested through an LTE BSR message and a D2D BSR message, and granted data amount.

When the load metric value calculated in the AP is transferred to a signaling protocol layer 1437 of a PC5-D interface, the load metric value may be included in a relay discovery message after passing a MAC layer 1439 and a PHY layer 1441 and the relay discovery message may be transmitted to the remote UE 1401.

An operating process of a relay UE in a case that a load metric value is calculated in an AP in a wireless communication system according to an embodiment of the present disclosure has been described with reference to FIG. 14A, and an operating process of a relay UE in a case that a load metric value is calculated in a communication processor (CP) in a wireless communication system according to an embodiment of the present disclosure will be described with reference to FIG. 14B.

Figure 14B:
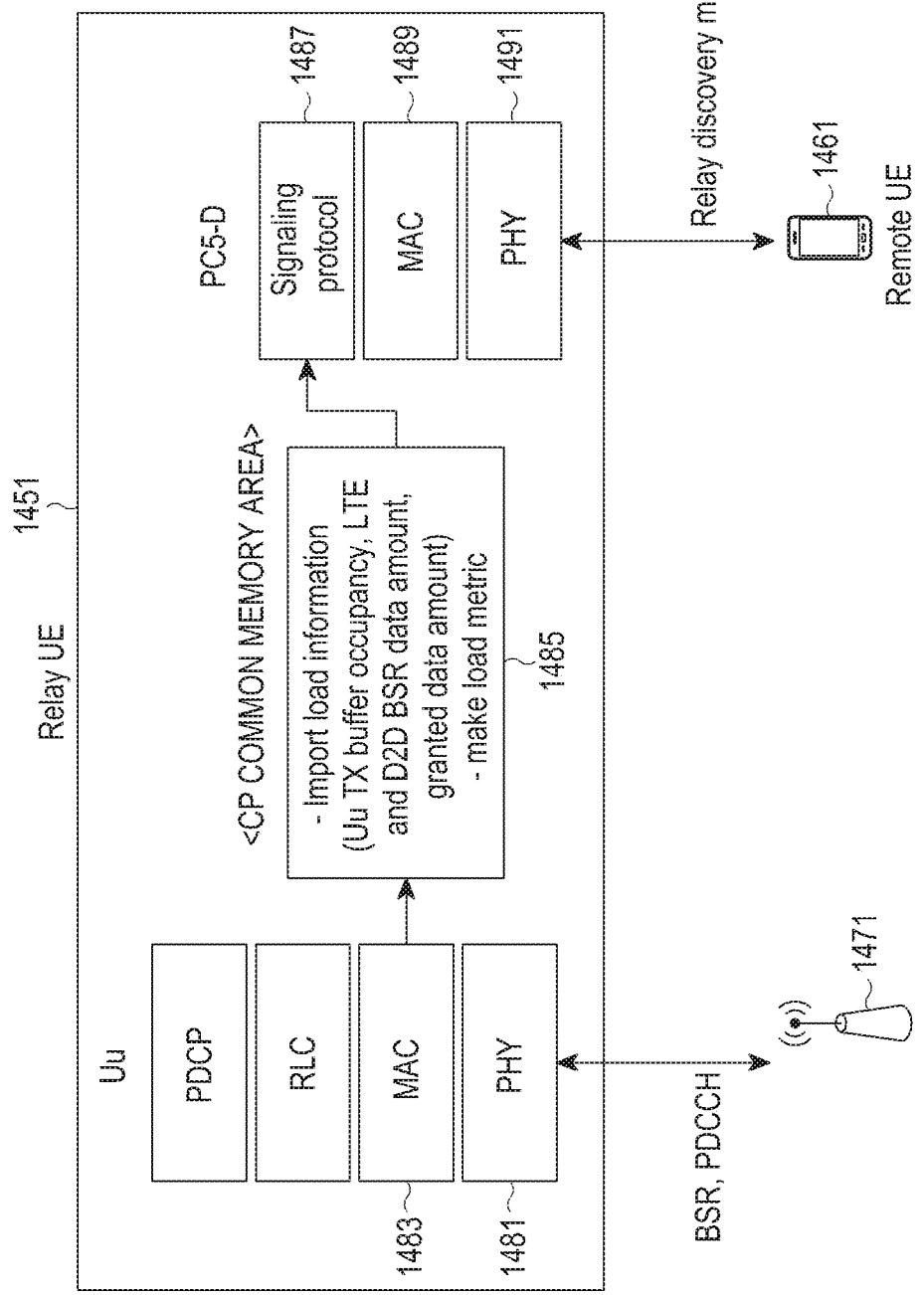
FIG. 14B schematically illustrates an operating process of a relay UE in a case that a load metric value is calculated in a cyclic prefix (CP) in a wireless communication system according to an embodiment of the present disclosure.

FIG. 14B schematically illustrates an operating process of a relay UE in a case that a load metric value is calculated in a CP in a wireless communication system according to an embodiment of the present disclosure.

Referring to FIG. 14B, a CP may be a processor which may perform a calculating operation or a data processing operation.

The relay UE 1511 may receive a resource allocation message including resource allocation information about a resource which the eNB 1471 allocates for the relay UE 1451 through a PDCCH in response to a BSR message which the relay UE 1451 transmits to the eNB 1471 through a PHY layer 1481. When the received resource allocation message is transferred from the PHY layer 1481 to a MAC layer 1483, a CP may calculate a load metric value based on data capacity of a Uu TX buffer which is imported to a common memory area 1485 of the CP, data amount requested through an LTE BSR message and a D2D BSR message, and granted data amount.

When the load metric value calculated in the CP is transferred to, for example, a signaling protocol layer 1487 of a PC5-D interface in an LTE standard, the load metric value may be included in a relay discovery message after passing a MAC layer 1489 and a PHY layer 1491 and the relay discovery message may be transmitted to the remote UE 1461.

Examples of an operating process of a remote UE in a wireless communication system according to an embodiment of the present disclosure will be described with reference to FIGS. 15A and 15B.

Figure 15A:
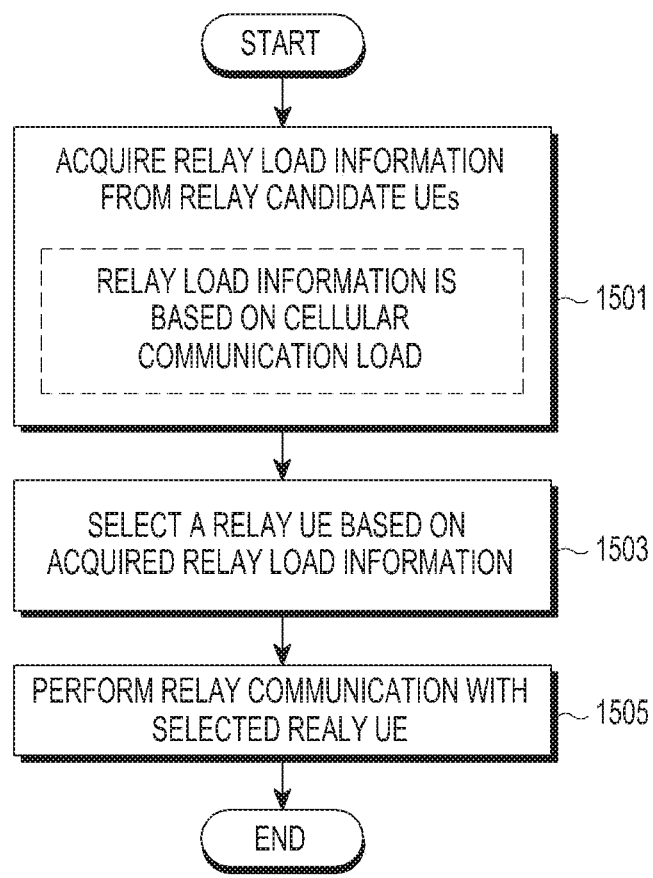
FIG. 15A schematically illustrates an example of an operating process of a remote UE in a wireless communication system according to an embodiment of the present disclosure.

FIG. 15A schematically illustrates an example of an operating process of a remote UE in a wireless communication system according to an embodiment of the present disclosure.

Referring to FIG. 15A, a remote UE may acquire relay load information from each of a plurality of relay candidate UEs at operation 1501.

Here, the relay load information may be information which is generated based on cellular communication load between a relay candidate UE and an eNB connected to the relay candidate UE.

The cellular communication load may be determined based on, for example, data amount granted from an eNB during a set time. Alternatively, the cellular communication load may be determined based on amount of data to be transmitted to the eNB which is buffered at a UL buffer. Alternatively, the cellular communication load may be determined based on a ratio of UL data amount which the remote UE requests from the eNB during a set time to UL data amount granted from the eNB during the set time.

Referring back to FIG. 15A, the remote UE may select a relay UE which will perform a relay communication with the remote UE based on the acquired relay load information at operation 1503.

The remote UE may perform the relay communication with the selected relay UE at operation 1505.

Figure 15B:
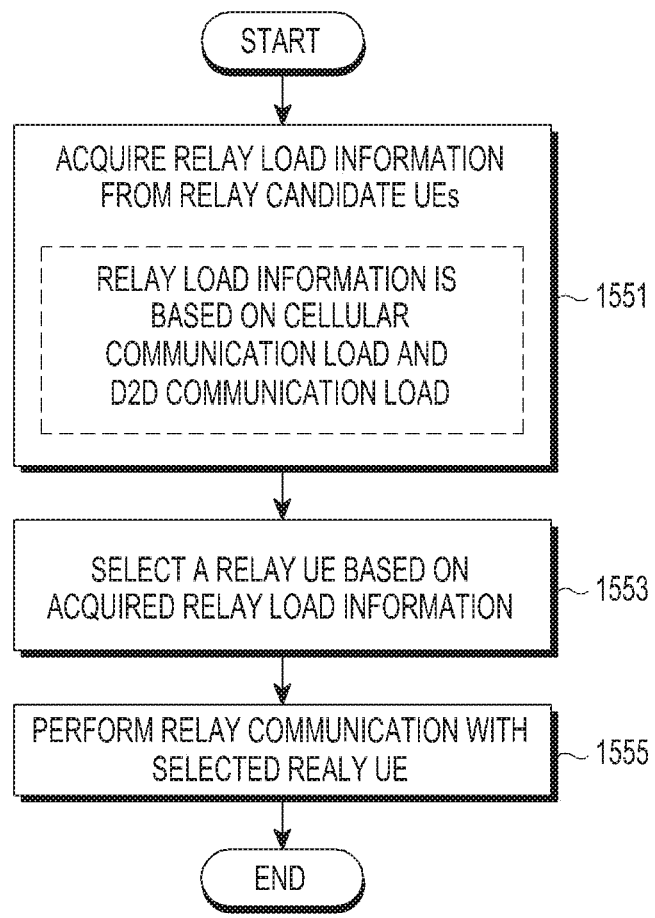
FIG. 15B schematically illustrates another example of an operating process of a remote UE in a wireless communication system according to an embodiment of the present disclosure.

FIG. 15B schematically illustrates another example of an operating process of a remote UE in a wireless communication system according to an embodiment of the present disclosure.

Referring to FIG. 15B, a remote UE may acquire relay load information from each of a plurality of relay candidate UEs at operation 1551.

Here, the relay load information may be information which is generated based on cellular communication load between a relay candidate UE and an eNB connected to the relay candidate UE and D2D communication load between the relay candidate UE and a remote UE connected to the relay candidate UE.

Here, the D2D communication load may be determined based on D2D data amount granted from the remote UE during a set time.

The relay load information may be determined based on a value superposed by applying a weight to each of the cellular communication load and the D2D communication load.

Referring back to FIG. 15B, the remote UE may select a relay UE which will perform a relay communication with the remote UE based on the acquired relay load information at operation 1553.

The remote UE may perform the relay communication with the selected relay UE at operation 1555.

Although FIGS. 15A and 15B illustrate examples of an operating process of a remote UE in a wireless communication system according to an embodiment of the present disclosure, various changes could be made to FIGS. 15A and 15B. For example, although shown as a series of operations, various operations in FIGS. 15A and 15B could overlap, occur in parallel, occur in a different order, or occur multiple times.

Examples of an operating process of a remote UE in a wireless communication system according to an embodiment of the present disclosure have been described with reference to FIGS. 15A and 15B, and still another example of an operating process of a relay UE in a wireless communication system according to an embodiment of the present disclosure will be described with reference to FIG. 16.

Figure 16:
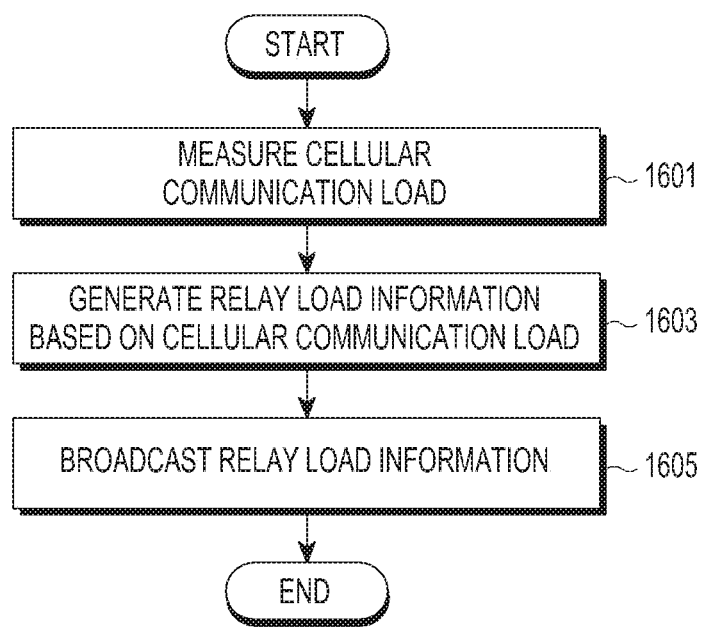
FIG. 16 schematically illustrates still another example of an operating process of a relay UE in a wireless communication system according to an embodiment of the present disclosure.

FIG. 16 schematically illustrates still another example of an operating process of a relay UE in a wireless communication system according to an embodiment of the present disclosure.

Referring to FIG. 16, a relay UE may estimate cellular communication load between the relay UE and an eNB connected to the relay UE at operation 1601.

The relay UE may generate relay load information which is based on the estimated cellular communication load at operation 1603.

The relay UE may broadcast the generated relay load information at operation 1605.

Here, the relay UE may measure D2D communication load between a relay candidate UE and a remote UE connected to the relay candidate UE, and generate relay load information which is based on the measured cellular communication load and the measured D2D communication load.

Meanwhile, the relay UE may receive relay load information of other relay UE, and determine whether to release a connection for a remote UE being connected to the relay UE based on the received relay load information of the other UE.

Although FIG. 16 illustrates still another example of an operating process of a relay UE in a wireless communication system according to an embodiment of the present disclosure, various changes could be made to FIG. 16. For example, although shown as a series of operations, various operations in FIG. 16 could overlap, occur in parallel, occur in a different order, or occur multiple times.

Various embodiments of the present disclosure enable to perform a relay communication based on relay load in a wireless communication system.

Various embodiments of the present disclosure enable to perform a relay communication based on at least one of relay load, cellular communication load, and D2D communication load in a wireless communication system.

Various embodiments of the present disclosure enable to increase reliability of a communication system such that degradation of communication quality due to load unbalance which may occur when a remote UE and a relay UE perform a wireless communication using a relay scheme may be solved.

Various embodiments of the present disclosure enable to provide information about communication load of a relay UE from the relay UE to a remote UE with various forms such that the remote UE may select an optimal relay UE.

Various embodiments of the present disclosure enable to select an optimal relay UE based on a received load metric and a traffic characteristic of a remote UE in the remote UE.

Various embodiments of the present disclosure enable to stably communicate with an eNB based on a service scheme in a remote UE located out of a coverage of the eNB when a disaster occurs in a wireless communication system.

In addition, effects obtainable in the present disclosure are not limited to the effects as described above, and other effects not described above will become apparent to those skilled in the art from the following detailed description.

It should be noted that a code configuration diagram, a structure diagram of a wireless communication system, flowcharts of a transmitting/receiving method, a signal flow diagram described in FIGS. 1 to 16 are not intended to limit the scope of the present disclosure. That is, any information, fields, components, or operations in FIGS. 1 to 16 should not be construed as essential element to implement the present disclosure, and it will be noted that the present disclosure may be implemented using a part of any information, fields, components, or operations in FIGS. 1 to 16 without departing from the scope of the present disclosure.

Further, operations in FIGS. 1 to 16 may be realized by including a memory storing a corresponding program code into a component included in an entity, a function, an eNB, and/or a UE in a wireless communication system, and/or a vehicle. That is, a processor of the entity, the function, the eNB, the UE, and/or the vehicle reads or runs the program code stored at the memory through a central processing unit (CPU) to realize the operations in FIGS. 1 to 16.

Various components, modules, and/or the like of an entity, a function, an eNB, a UE, and/or a vehicle described in the detailed description may be operated using a hardware circuit, for example, a complementary metal oxide semiconductor-based logical circuit, a firmware, a software, and/or a hardware and a firmware, and/or a combination of software inserted in a machine readable medium. For example, various electric structures and method may be implemented with electric circuits such as transistors, logic gates, an application specific integrated circuit (ASIC), and/or the like.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile memory, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital versatile disc (DVD), a magnetic disk, a magnetic tape, and/or the like).A method and apparatus according to an embodiment of the present disclosure may be implemented by a computer or a mobile terminal that includes a processor and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a transceiver for performing a wired or a wireless communication with a graphic processing device, and a processor for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of a remote user equipment (UE), the method comprising:
   receiving an indicator from at least one relay candidate UE; and
   receiving a relay service from a relay UE based on the indicator,
   wherein the indicator is used to indicate whether a relay candidate UE has resources available to provide a relay service for additional remote UEs.

2. The method of claim 1, wherein the relay UE is selected from among the at least one relay candidate UE based on the indicator received from each of the at least one relay candidate UE.

3. The method of claim 1,
   wherein the indicator indicates one of a first value and a second value,
   wherein the first value indicates the relay candidate UE does not have the resources available to provide the relay service for the additional remote UEs, and
   wherein the second value indicates the relay candidate UE has the resources available to provide the relay service for the additional remote UEs.

4. The method of claim 1, wherein the indicator is included in a message, and the message further includes an identifier (ID) of the relay candidate UE.

5. The method of claim 1, wherein the indicator is included in a message, and the message further includes a relay service code to identify a relay service which the relay candidate UE provides.

6. The method of claim 1, wherein the relay UE is selected from among the at least one relay candidate UE based on the indicator received from each of the at least one relay candidate UE and a ratio of uplink (UL) traffic to downlink (DL) traffic in the remote UE during a set time.

7. A method of a relay user equipment (UE), the method comprising:
   generating an indicator; and
   transmitting the indicator,
   wherein the indicator is used to indicate whether the relay UE has resources available to provide a relay service for additional remote UEs.

8. The method of claim 7,
   wherein the indicator indicates one of a first value and a second value,
   wherein the first value indicates the relay UE does not have the resources available to provide the relay service for the additional remote UEs, and
   wherein the second value indicates the relay UE has the resources available to provide the relay service for the additional remote UEs.

9. The method of claim 7, wherein the indicator is included in a message, and the message further includes an identifier (ID) of the relay UE.

10. The method of claim 7, wherein the indicator is included in a message, and the message further includes a relay service code to identify a relay service which the relay UE provides.

11. A remote user equipment (UE), the remote UE comprising:
at least one processor; and
a transceiver configured to receive an indicator from at least one relay candidate UE and receive a relay service from a relay UE based on the indicator,
wherein the indicator is used to indicate whether a candidate UE has resources available to provide a relay service for additional remote UEs.

12. The remote UE of claim 11,
wherein the indicator indicates one of a first value and a second value,
wherein the first value indicates the relay candidate UE does not have the resources available to provide the relay service for the additional remote UEs, and
wherein the second value indicates the relay candidate UE has the resources available to provide the relay service for the additional remote UEs.

13. The remote UE of claim 11, wherein the indicator is included in a message, and the message further includes an identifier (ID) of the relay candidate UE.

14. The remote UE of claim 11, wherein the indicator is included in a message, and the message further includes a relay service code to identify a relay service which the relay candidate UE provides.

15. The remote UE of claim 11, wherein the relay UE is selected from among the at least one relay candidate UE based on the indicator received from each of the at least one relay candidate UE and a ratio of uplink (UL) traffic to downlink (DL) traffic in the remote UE during a set time.

16. The remote UE of claim 11, wherein the relay UE is selected from among the at least one relay candidate UE based on the indicator received from each of the at least one relay candidate UE.

17. A relay user equipment (UE), the relay UE comprising:
at least one processor configured to generate an indicator; and
a transceiver configured to transmit the indicator,
wherein the indicator is used to indicate whether the relay UE has resources available to provide a relay service for additional remote UEs.

18. The relay UE of claim 17,
wherein the indicator indicates one of a first value and a second value,
wherein the first value indicates the relay UE does not have the resources available to provide the relay service for the additional remote UEs, and
wherein the second value indicates the relay UE has the resources available to provide the relay service for the additional remote UEs.

19. The relay UE of claim 17, wherein the indicator is included in a message, and the message further includes an identifier (ID) of the relay UE.

20. The relay UE of claim 17, wherein the indicator is included in a message, and the message further includes a relay service code to identify a relay service which the relay UE provides.

* * * * *